Sept. 19, 1933.   S. J. FINN   1,927,064
FOXING TREATING MACHINE
Filed Sept. 26, 1929   15 Sheets-Sheet 1

INVENTOR
Sidney J. Finn
By his Attorney
Nelson N. Howard

Sept. 19, 1933.  S. J. FINN  1,927,064
FOXING TREATING MACHINE
Filed Sept. 26, 1929   15 Sheets-Sheet 3

INVENTOR
Sidney J. Finn
By his Attorney,
Nelson N. Howard

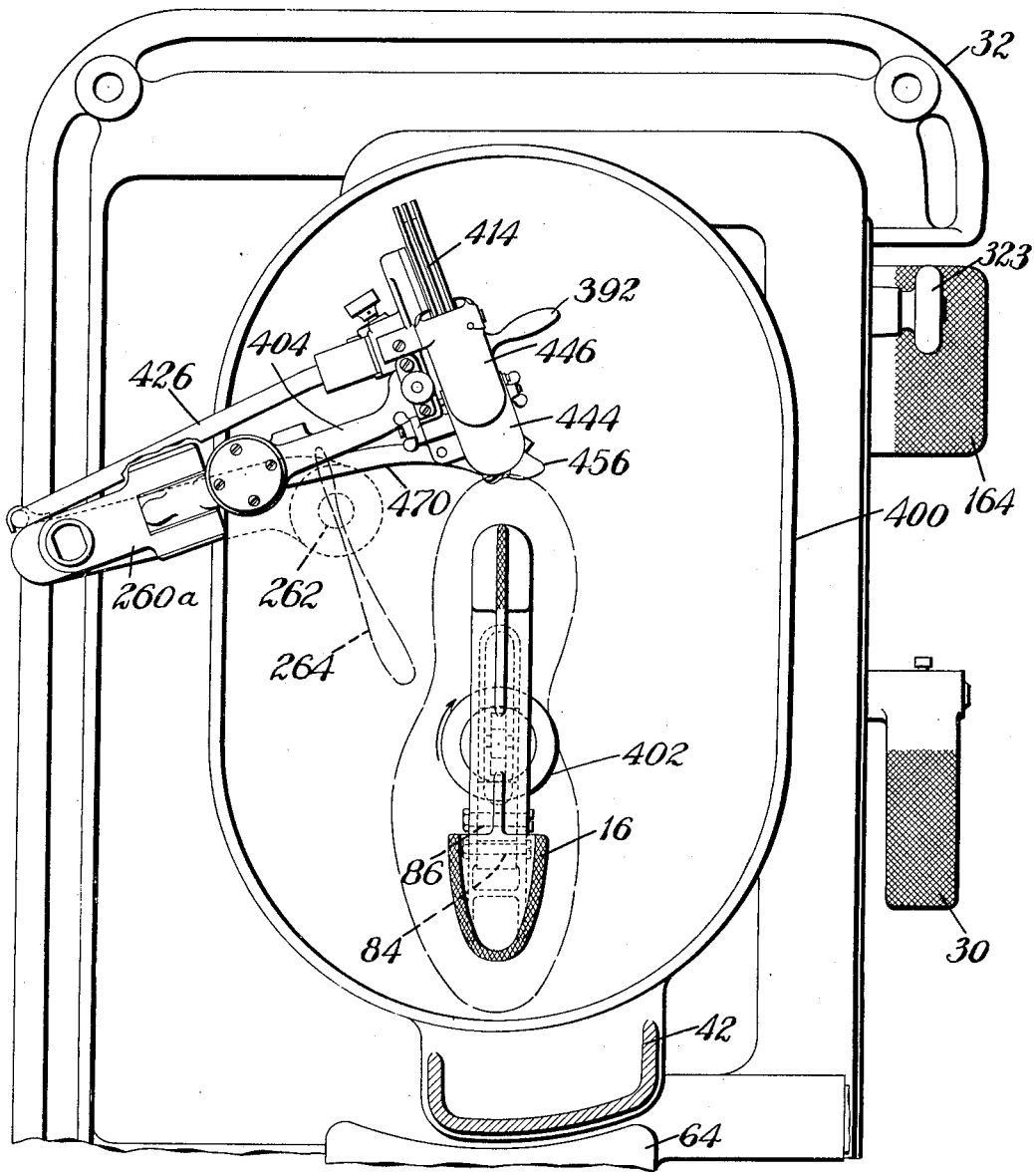

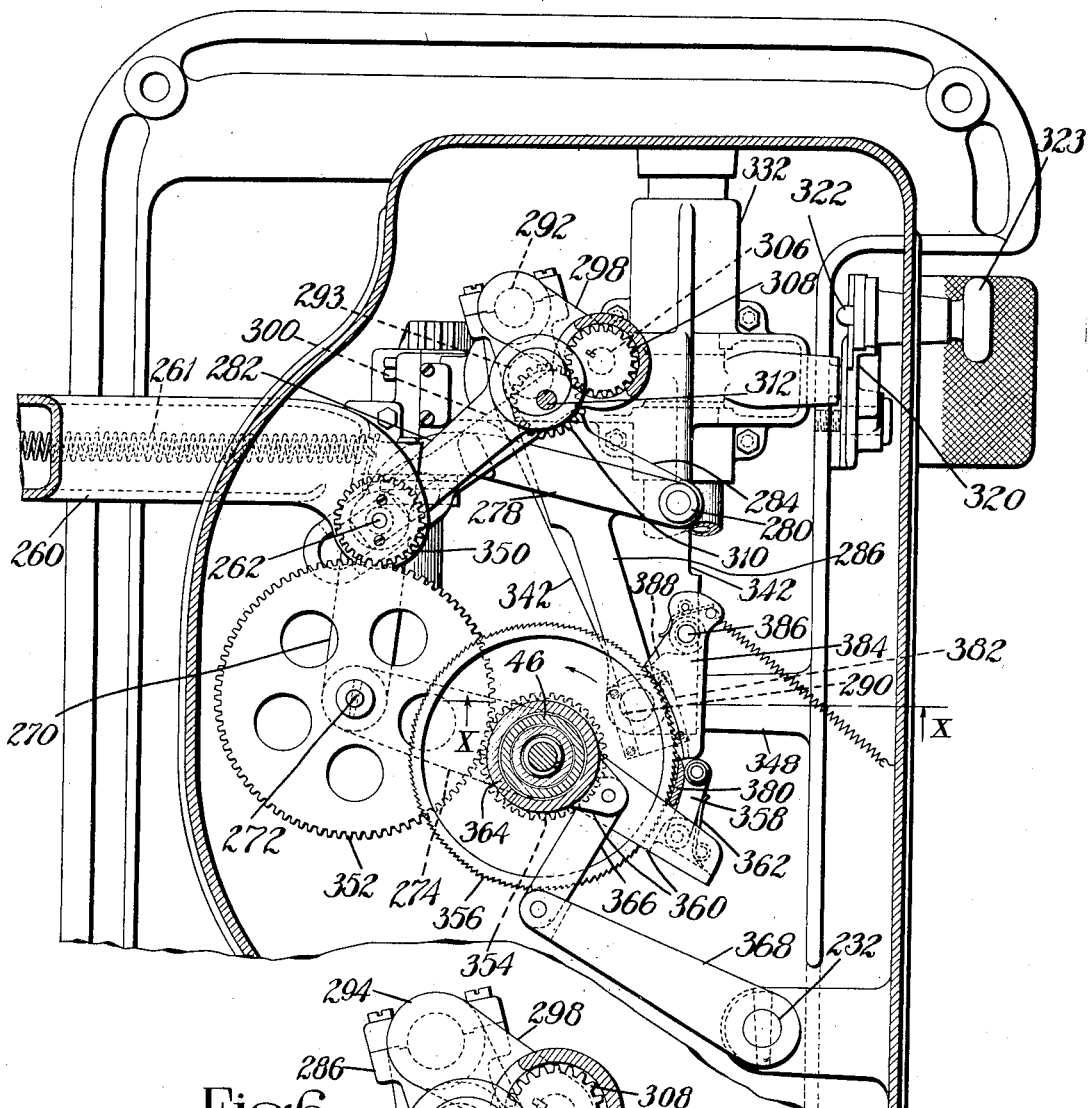
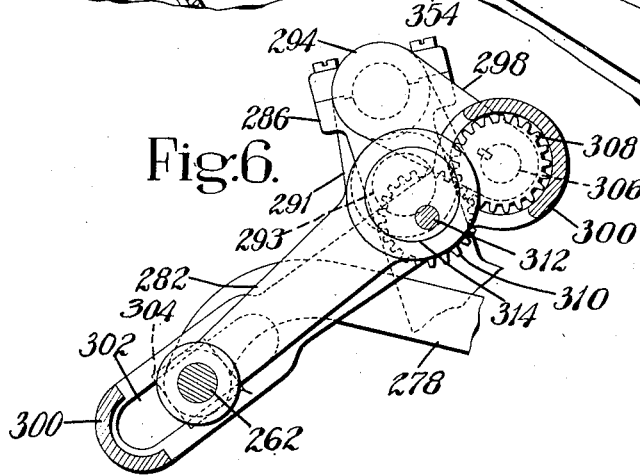

Fig. 7.

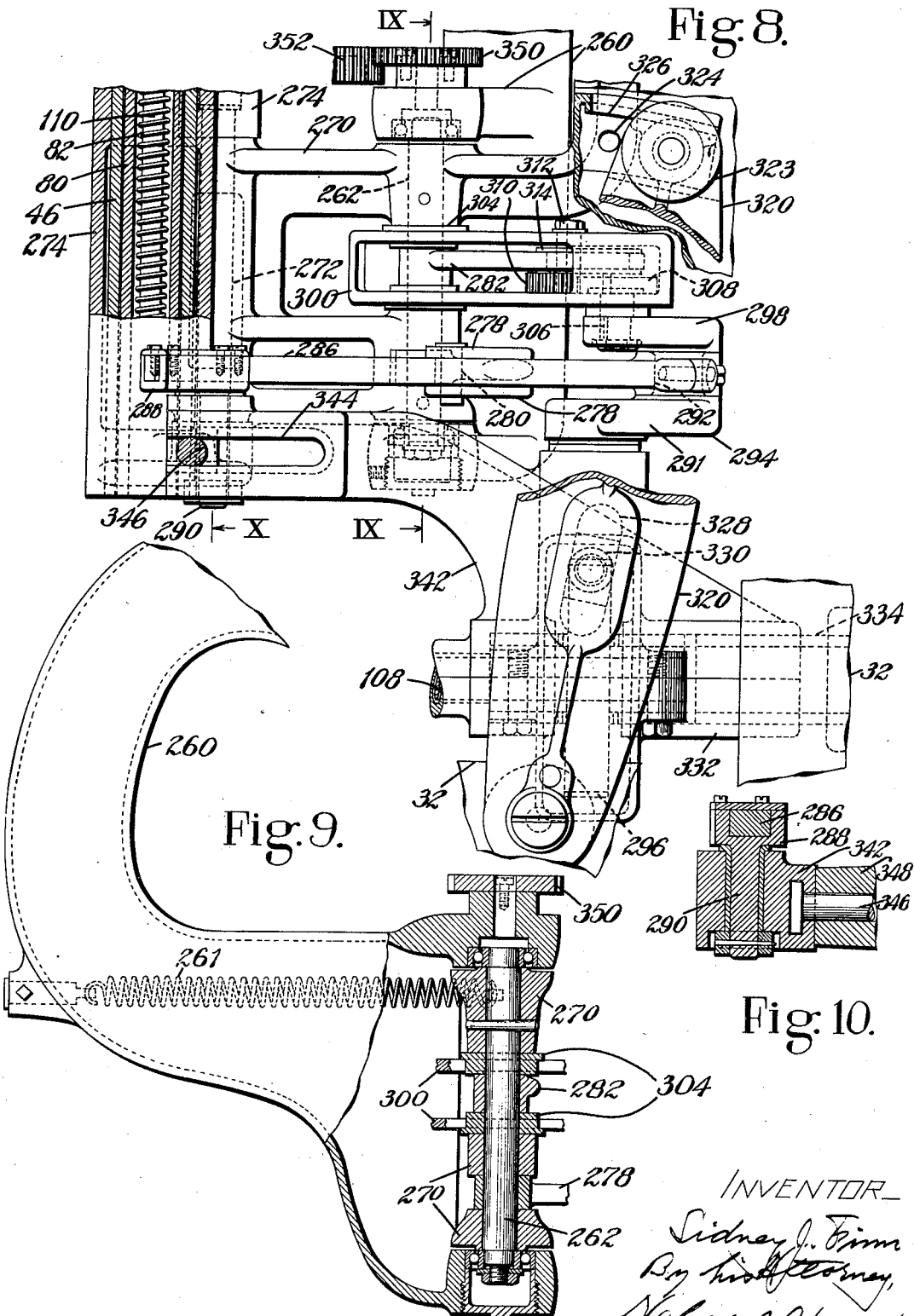

Sept. 19, 1933.  S. J. FINN  1,927,064
FOXING TREATING MACHINE
Filed Sept. 26, 1929  15 Sheets-Sheet 8

INVENTOR
Sidney J. Finn
By his Attorney,
Nelson W. Howard

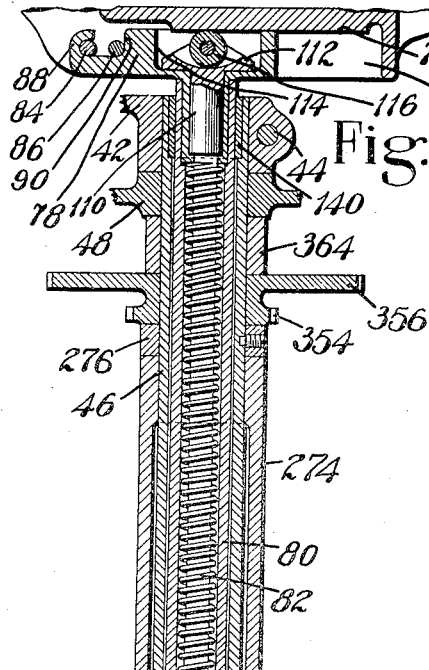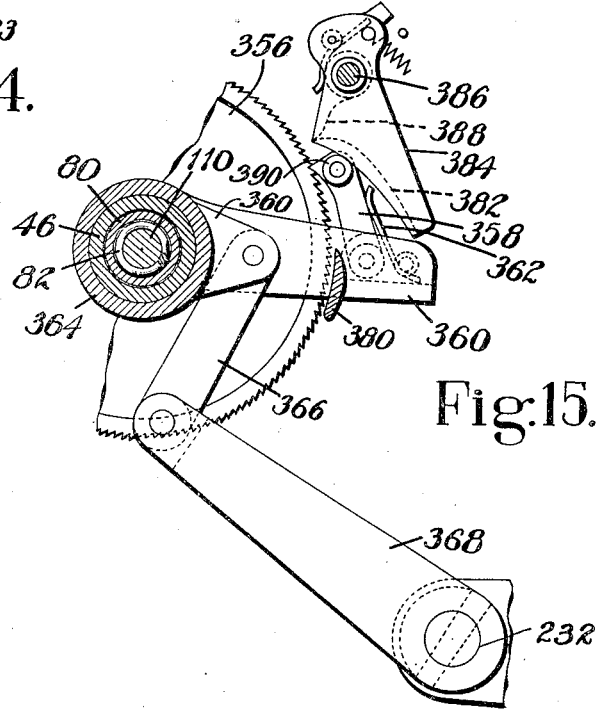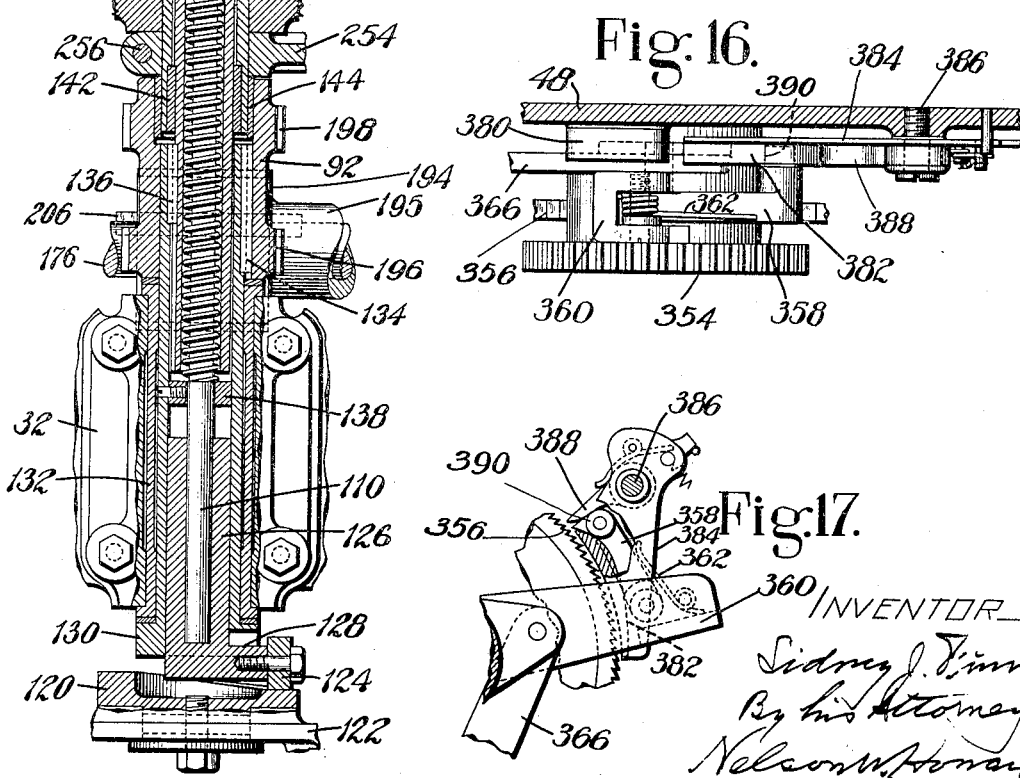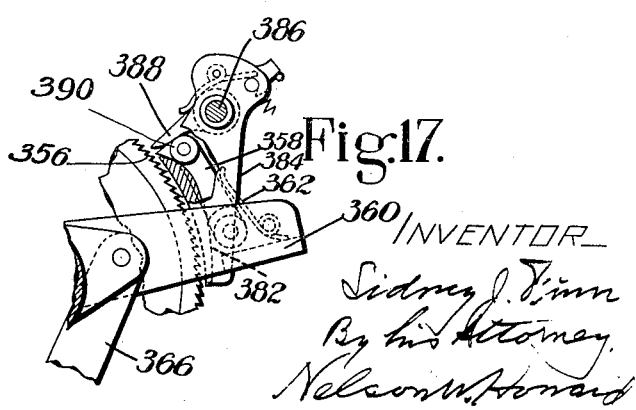

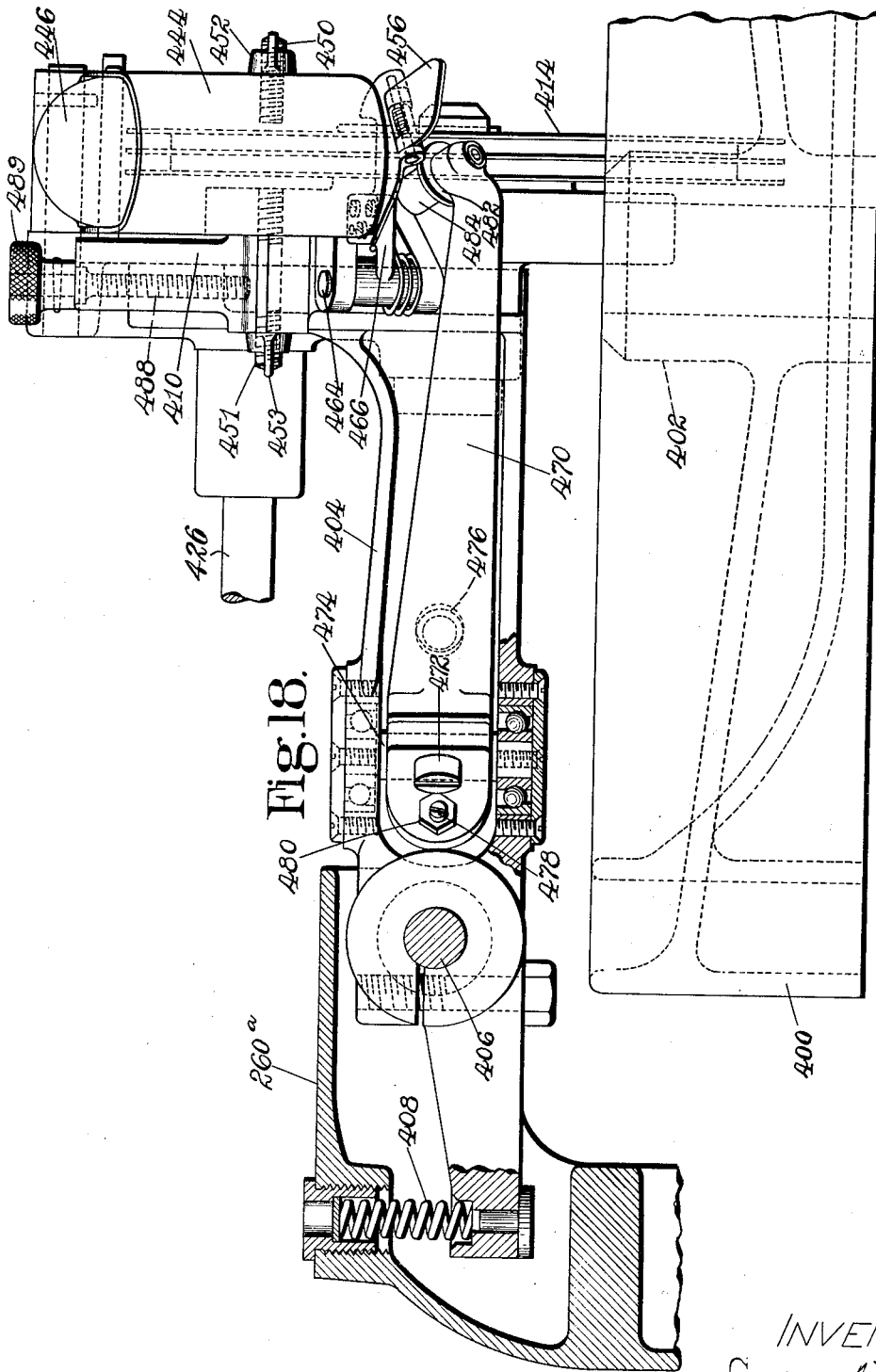

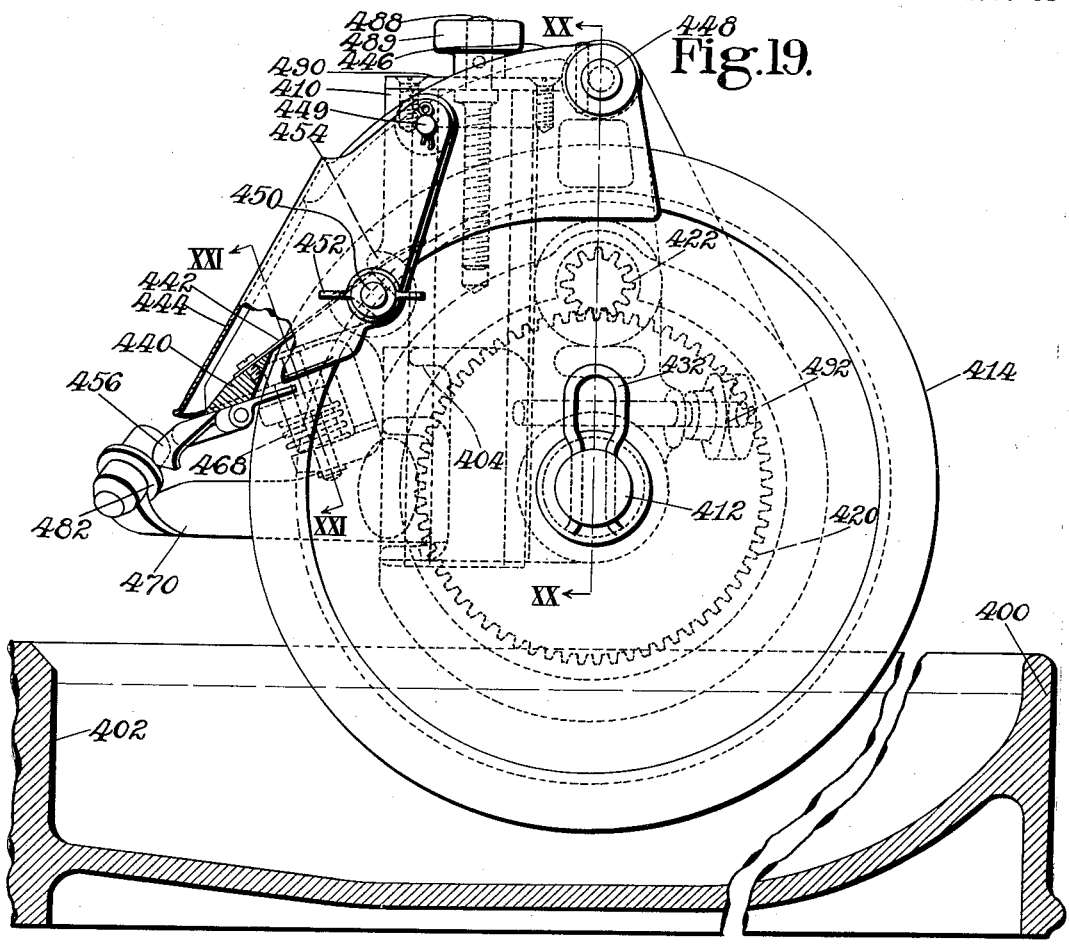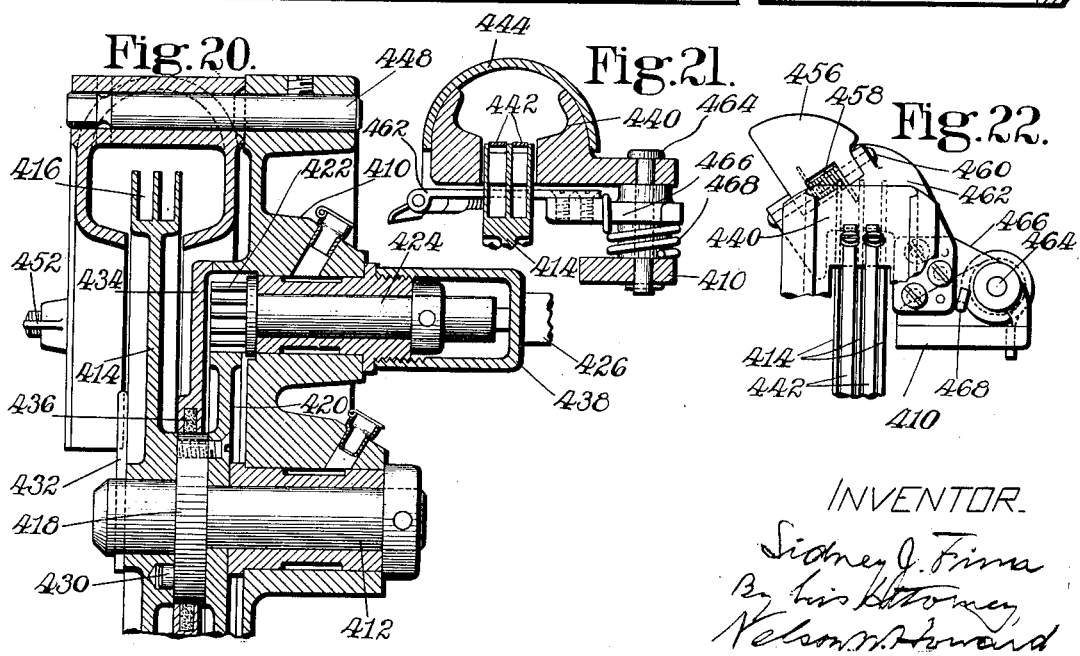

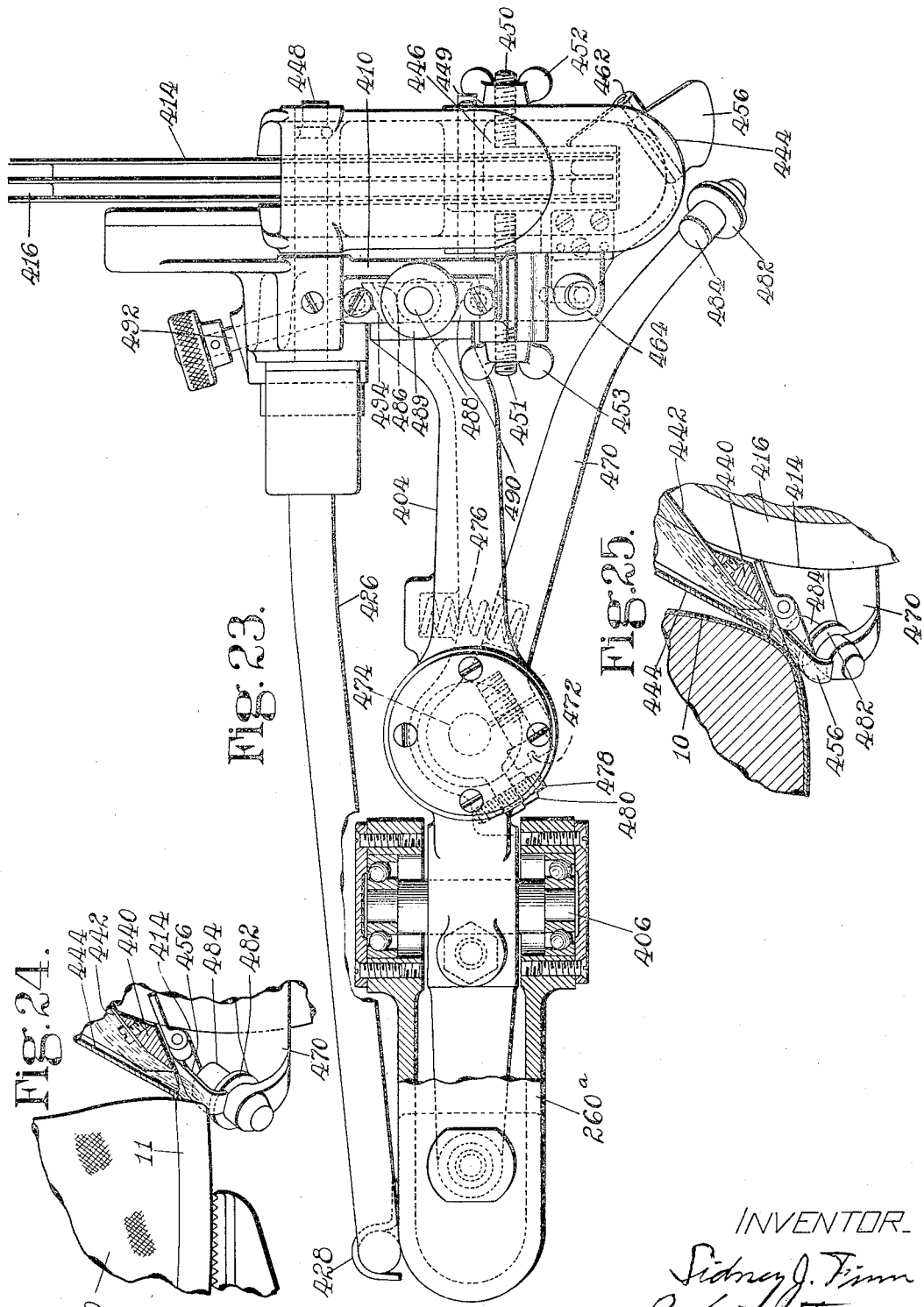

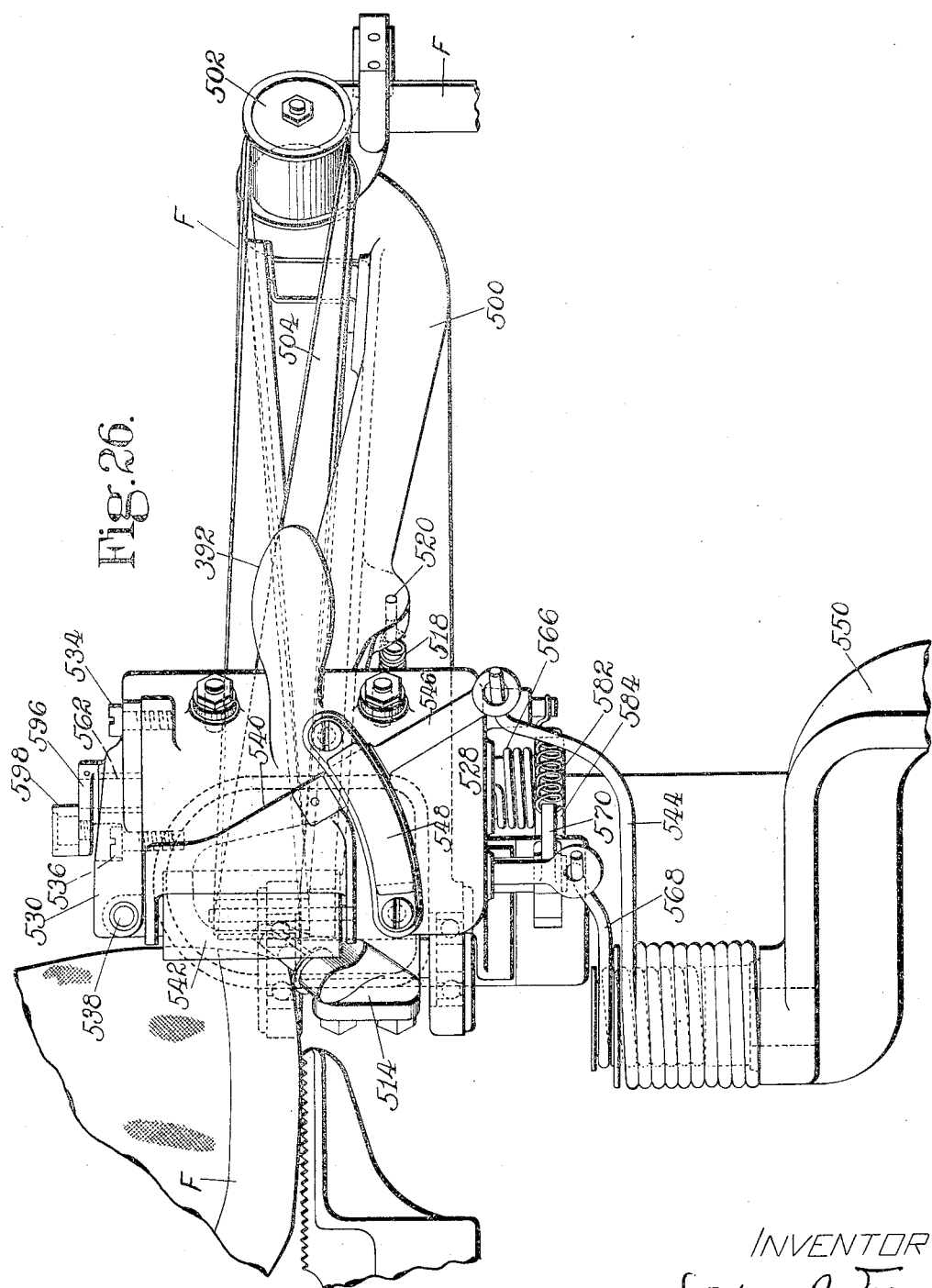

Sept. 19, 1933.  S. J. FINN  1,927,064
FOXING TREATING MACHINE
Filed Sept. 26, 1929  15 Sheets-Sheet 14

INVENTOR.
Sidney J. Finn
By his Attorney,
Nelson W. Howard

Patented Sept. 19, 1933

1,927,064

UNITED STATES PATENT OFFICE 1,927,064

FOXING TREATING MACHINE

Sidney J. Finn, Beverly, Mass., assignor to United Shoe Machinery Corporation, Paterson, N. J., a corporation of New Jersey Application September 26, 1929
Serial No. 395,346

84 Claims. (Cl. 12—1)

This invention relates to machines for operating upon the foxing areas of rubber soled shoes of the tennis type and is herein illustrated as embodied in a machine capable of use alternatively as a foxing-cementing machine or as a foxing-laying machine. The general organization of the illustrated machine is similar to that of the foxing-laying machine set forth in Letters Patent of the United States No. 1,863,747 granted June 21, 1932, upon my application Serial No. 216,399, filed Aug. 30, 1927, in which the point of operation of a tool for treating the foxing area of a shoe is caused to be transferred around the foxing area of the shoe by relative movement between the tool and the shoe, the machine disclosed in the patent referred to having provision for turning the shoe relatively to a tool which is mounted on a swinging arm and is maintained in contact with the shoe regardless of variations widthwise of the shoe in the peripheral contour of the foxing area.

In the manufacture of rubber soled shoes of the so-called tennis type, which usually have canvas uppers, it is the practice to apply a stripe of cement to the lower marginal portion of the shoe upper, known as the foxing area, and then to apply to the cement-coated foxing area a rubber strip known as a foxing strip, after which a rubber outsole is pressed against the bottom of the shoe, the marginal portions of the outsole being secured to the foxing strip.

In order that the machine may be nearly automatic in its operation and require less skill on the part of the operator, the machine is so arranged that, after the operator has positioned the shoe upon the lower of two clamping devices, he will be able to set the machine in motion, whereupon the shoe will be automatically, and by the power of the machine, clamped, depressed to operating level, the tool brought up into contact with the shoe, the latter turned in the desired relation to the tool, and subsequently the tool withdrawn from the shoe and the clamping means released.

The machine is also provided with improved shoe locating and clamping mechanism, the locating mechanism being positioned above the general plane of operation of the tool so as to be out of the way during the operation of the machine, and the clamping mechanism being arranged to grasp the shoe and its last in such an elevated position and then to depress the shoe automatically to the operating level.

Improved mechanism is provided for gradually accelerating and decelerating the shoe rotation to avoid a jerky operation of the machine. A novel mechanism is also provided for tilting the shoe during its rotation so as to assist in maintaining the various portions of the foxing area, and notably the portion around the toe end of the shoe, more nearly at the operating level along the rest of the shoe.

In performing the foxing-cementing operation, it is important that the application of cement be limited accurately to the desired area in order that the upper edge of the stripe of cement shall not be either above the upper edge of the foxing area where it may be exposed in the finished shoe, or below that upper edge with consequent liability that it will fail to secure the foxing strip fully to the shoe. Moreover, when the foxing strip is applied to the cement-coated foxing area, it is important that it be positioned accurately on the coated area, in order that it may be adequately secured and in order that no cement may be exposed above the foxing strip. On the other hand, the upper edge of the foxing area varies heightwise of the shoe at different parts of the shoe. The machine is provided with foxing-treating means mounted not only for in-and-out movements in directions toward or from the shoe to compensate for changes widthwise of the shoe in the peripheral contour of the foxing area, but also for up-and-down movements heightwise of the shoe, which latter movements are controlled directly by a member rolling along the bottom of the shoe which controls the heightwise movements of the tool. There would be danger that the bottom engaging member would ride over the edge of the shoe during relative traversing movement between the tool and the shoe were it not for the fact that, as illustrated, and in accordance with features of the invention, said member is constructed and arranged to tend always to creep toward the central portion of the shoe, such creeping tendency being limited by a co-acting member which is here shown as engaging the peripheral corner of the shoe at or closely adjacent to the foxing area. Because of the fact that portions of the foxing area are under-cut instead of making a sharp angle with the bottom of the shoe as they do around the toe and heel, the bottom contacting member in the illustrated machine is mounted for in-and-out movements with respect to the treating tool and the creeping tendency previously noted is utilized for maintaining this bottom contacting member within the bottom area so as always to insure engagement of said member with the bottom of the shoe.

The irregular peripheral contour of the foxing area and the resulting changing radius between the center of rotation of the shoe and its point of contact with the operating tool make it important to change the relation of the swinging tool-carrying arm to the axis about which the shoe is rotated, in order to compensate for the changing radius and thus maintain the proper relation between the tool and the portions of the shoe to be treated. Considered in another aspect, the invention provides improved compensating mechanism for this purpose, which mechanism comprises operator-controlled means by which the desired compensation may be effected within relatively wide limits, thereby better adapting the machine for extreme differences in sizes, such as are found, for example, between the smaller sizes of children's shoes and the larger sizes of men's shoes. In the illustrated construction, there is provided a hand lever which may be set in various positions and by means of which the compensating mechanism is shifted bodily from one position to another.

When the illustrated machine is to be used for foxing cementing, it is equipped with novel cement-applying means by which a heavy coating of cement may be applied to the foxing area during a single relative traversing movement between the shoe and the cement-applying means, said coating being deposited exactly upon the foxing area of the shoe. The novel features of the illustrated cement-applying means are not claimed herein since they are claimed in my copending application, Serial No. 621,443, filed July 8, 1932, which is a division of the present application.

When the machine is to be used for foxing laying it is provided with a foxing laying tool similar in general arrangement to that disclosed in Letters Patent of the United States No. 1,863,747 to which reference has been made above. The arrangement there shown delivers a strip of foxing to the shoe by means of an endless supporting belt and applies it by a roll which constitutes one of the guides for said belt. Associated with this applying roll is a presser roll which follows the applying roll around the shoe and forces the foxing into firm engagement with the shoe. The presser roll herein illustrated is mounted upon a carrier which is secured directly to the tool carrying arm and this foxing presser roll is pivotally mounted in a hanger which swings from the carrier, being itself capable of in-and-out movement with respect to the applying roll.

Still further to lessen the demands upon the operator, improved cutting-off means is provided which is associated with the foxing laying tool and arranged automatically to sever the end of a foxing strip which has been applied to the shoe. As herein illustrated, this severing occurs at a position between the applying roll and the shoe as the two are separated just at the termination of the operation. The cutting-off means is in the form of shears mounted upon the carrier for the presser roll. One member of the shears is rotatable about a pivot, being spring pressed into cutting position and latched against the tension of this spring in inoperative or set position. A cooperating trigger and latch are arranged to release the cutting member by reason of relative movement between the presser roll carrier and the applying roll. Provision is made for resetting the cutting-off knife and in the illustrated construction this resetting mechanism is mounted for actuation by the shoe locating members as they are brought into engagement with the next shoe to be treated.

These and other features of the invention will be best understood from a consideration of the following description taken in connection with the accompanying drawings, in which Fig. 1 is a front elevation of the complete machine with parts broken away and in section;

Fig. 4 is a horizontal section showing the machine with the foxing cementing tool, the section being taken just below the shoe locating and upper clamping mechanism;

Fig. 5 is a horizontal section on the line V—V of Fig. 1;

Fig. 6 is an enlarged view of a portion of the compensating mechanism shown in Fig. 5;

Fig. 7 is a horizontal section through the center of the drive shaft on the line VII—VII in Fig. 1;

Fig. 8 is a front elevation of the compensating mechanism;

Fig. 9 is a vertical section on the line IX—IX of Fig. 8 of the lower end of the tool carrying arm;

Fig. 10 is a detail in section on the line X—X of Fig. 5;

Fig. 14 is a vertical section through the upright shoe carrying spindle and associated parts;

Fig. 15 is an enlarged view of a portion of the backing-off mechanism shown in Fig. 5 with the parts in another position;

Fig. 16 is an enlarged front elevation of these parts;

Fig. 17 is a fragmentary view similar to Fig. 15 to show the parts in still another position;

Fig. 18 is a side elevation of the carrying arm for the foxing cementing tool;

Fig. 19 is a front elevation of the foxing cementing tool with parts broken away and in section;

Fig. 20 is a vertical section through the tool on the line XX—XX of Fig. 19;

Fig. 21 is a detail in section on the line XXI—XXI of Fig. 19;

Fig. 22 is a detail view showing in plan the end of the cement trough and the cement deflector;

Fig. 23 is a plan view of the cementing tool and its carrying arm with parts in section;

Figs. 24 and 25 are fragmentary views in elevation showing the relation of the foxing cementing tool to the shoe at the heel end and at the shank respectively;

Fig. 26 is a front elevation of the foxing laying tool on a larger scale than Fig. 1;

Figure 1:
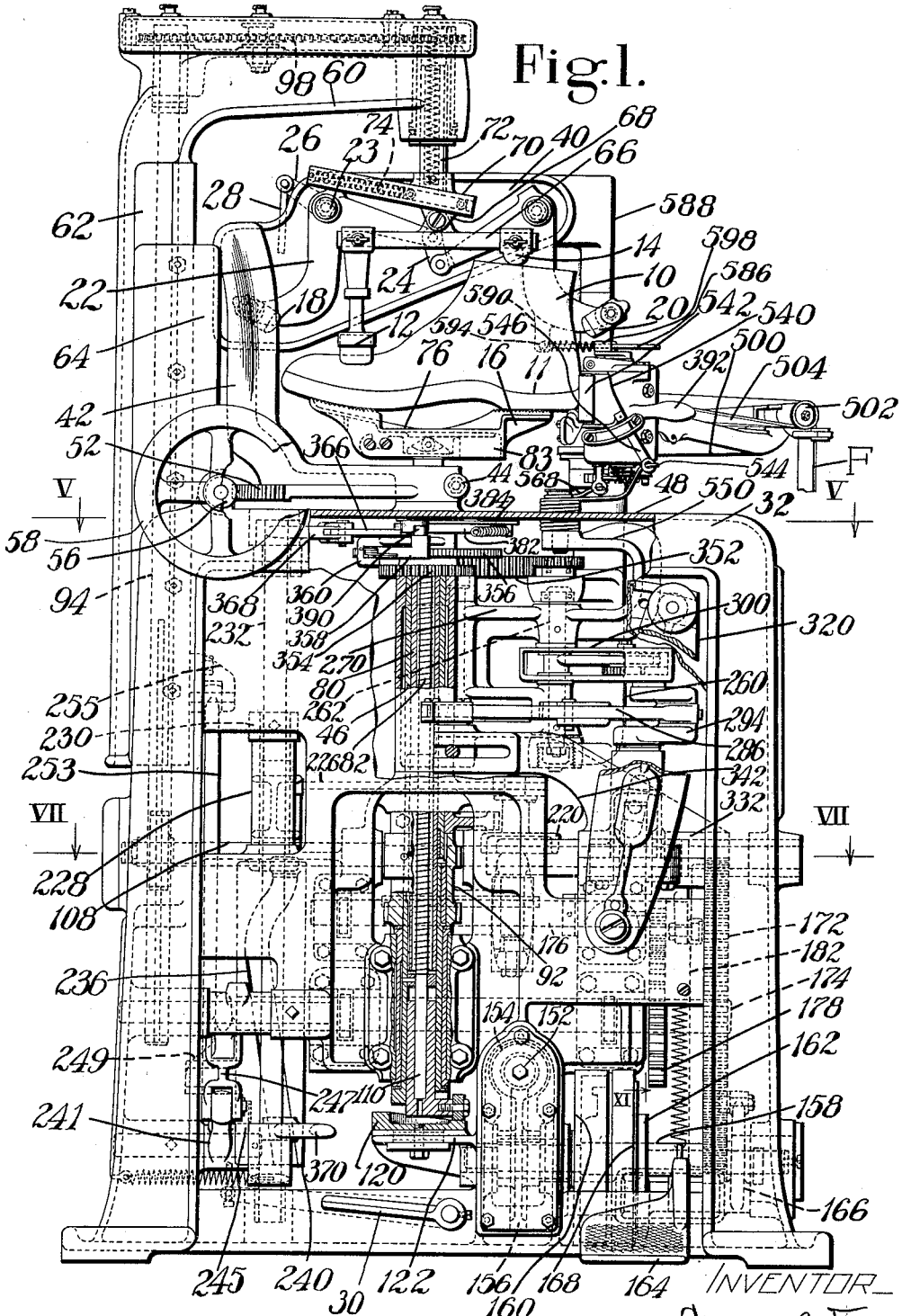

The machine herein illustrated is capable of use either as a foxing cementing machine or as a machine for laying a strip of foxing on the foxing area and, if the machine is to be changed from a foxing cementer, for example, to a foxing layer, the cementing tool mounted at the top of the machine is lifted off and a laying tool substituted. The shoe to be treated is held in an upright position and rotated around a vertical axis by synchronized upper and lower driven clamps or gripping means. Before the machine is set in motion the shoe is located between these clamps by means of locating devices engaging the toe and heel ends respectively and arranged above the operating zone so that they are out of the way. These locating devices are withdrawn from engagement with the shoe before the machine starts and the shoe is depressed to its operating zone before it starts to rotate. When the machine is used for cementing it will ordinarily be set to give the shoe a single complete revolution, but for foxing laying the machine is usually adjusted to rotate the shoe one complete turn plus the amount of the overlap of the foxing strip. The mechanism for controlling the overlap of the foxing strip is not claimed herein as it forms part of the subject matter of an application of L. E. James, Serial No. 556,351, filed August 11, 1931.

The arrangement is such that the shoe rotates about a fixed upright axis and consequently it is necessary for the arm carrying the tool to swing in and out to maintain contact of the tool with the shoe. Such a swinging mounting for the tool will cause the tool to work on a varying radius and, since the shoe is rotated at a constant angular velocity will give a varying speed of operation along the periphery of the shoe. This is overcome by means of an improved tool-carrying-arm compensating mechanism by means of which the pivot for the arm is moved through a closed path like a flattened ellipse, which movement, when combined with the rotation of the shoe, gives an approximately uniform speed of action and maintains the drag of the tool carrying arm substantially tangent to the shoe at the point of application of the tool. A hand lever 320 is arranged to move bodily the compensating mechanism to vary its field of operation for different classes of shoes.

Provision is made for backing off the tool-carrying arm from the shoe mechanically at the completion of the operation, this backing-off movement being a substantial constant amount without regard to the size of the shoe being treated, but this mechanism is not claimed herein as it is claimed in the aforementioned application of L. E. James. The shoe clamping members are mechanically separated at the end of the cycle to release the shoe.

When the machine is used for foxing cementing, the cement is picked up from a large pan underlying the edge of the shoe, by means of feed wheels and delivered to a trough through which it flows down over the foxing area of the shoe as successive portions of that area are presented successively to the cementing tool. A shield overlying the trough bears against the upper edge of the foxing area to protect the shoe against spread of the cement beyond the foxing area and means are provided for rocking the tool up and down as it is moved in and out. This keeps the point of application of the tool strictly at the foxing area regardless of deviations of said area from a horizontal plane.

When the machine is used for foxing laying it is provided with a foxing laying tool having a suitable supporting belt and feed rolls arranged to deliver the strip of gum rubber to the shoe where it is pressed in place by another roll. Provision is made here, too, for tilting the tool arm up and down as it applies the foxing to successive portions of the shoe, thereby the more readily to guide the foxing strip to the foxing area. At the completion of an operation the strip of foxing is cut by means of a knife carried on the tool.

Shoe locating mechanism

A piece of work, such as a shoe 10, is held in the machine by an upper clamp 12—14 and a lower clamp or shoe supporting plate 16. At the completion of a previous operation these clamps are separated and are both in an elevated position, such that the lower portion of the shoe rests directly in the range of action of centering or locating devices 18 and 20. These locating devices (Figs. 1 and 3) are mounted for equal in and out movement by being carried upon the ends of interconnected bell cranks 22 which are joined at their inner ends by a link 24 and can be brought into engagement with the ends of a shoe by means of an arm 26 and a treadle rod 28. This rod 28 may be connected to the starting treadle 164 of the machine but is here shown as joined to a separate treadle 30 pivoted upon the base of a box-like frame 32. A pivot 23 for one of the bell cranks 22 extends through an enlargement of a casting 40 and is surrounded by a spring 25 by means of which the bell cranks are swung to carry the locating devices 18 and 20 away from the shoe when the treadle 30 is released.

Figure 3:
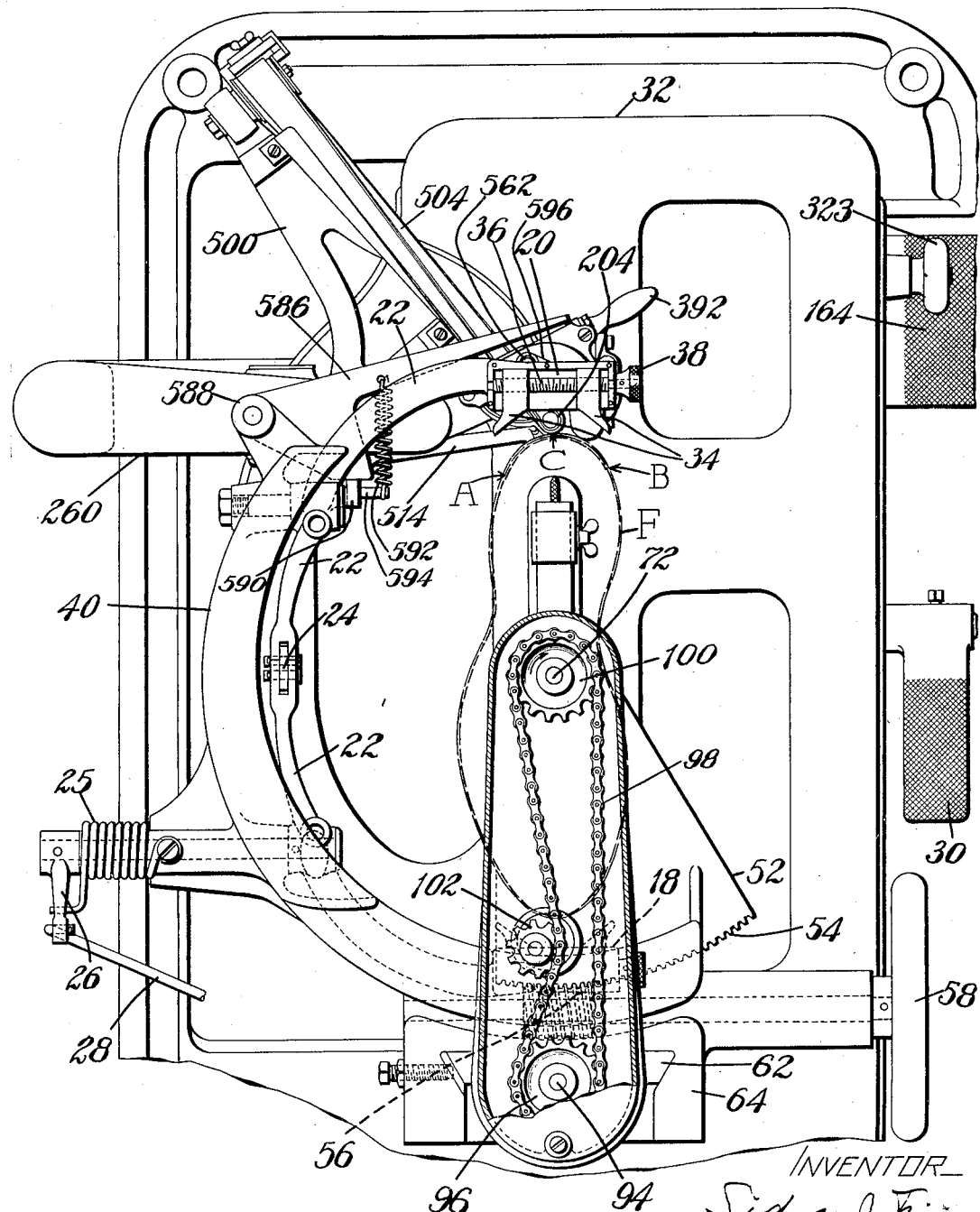
Fig. 3 is a plan view of the machine having the foxing laying tool attached thereto.

It will be seen from Fig. 3 that each of the centering devices comprises shoe engaging fingers 34 having inclined edges and slidably mounted in the outer end of one of the bell cranks 22 where their separation is determined by means of a right and left-hand screw 36 operated by a finger piece 38. The bell cranks 22 which support the shoe centering devices are pivoted on a casting 40 forming part of a bracket 42, the lower end of which is bent inwardly and clamped by means of a bolt 44 (Fig. 1) on the upper end of a sleeve 46 (Fig. 14) which passes down through the top cover 48 forming an integral part of the frame 32 and through a lower frame bearing 50, said sleeve being concentric with the axis of rotation of the shoe and being normally still during the operation of the machine but capable of adjustment as will be seen.

The bracket 42 is provided with a flat plate 52 (Figs. 1 and 3) having a toothed edge 54 for engagement with a worm 56 journaled in the frame of the machine and provided with a hand wheel 58 at the upper left corner of the frame of the machine. By turning this hand wheel the operator adjusts the position of the shoe-locating devices and the starting position of the shoe so as to determine the amount of overlap, as will be later described.

Shoe clamping mechanism

Figure 2:
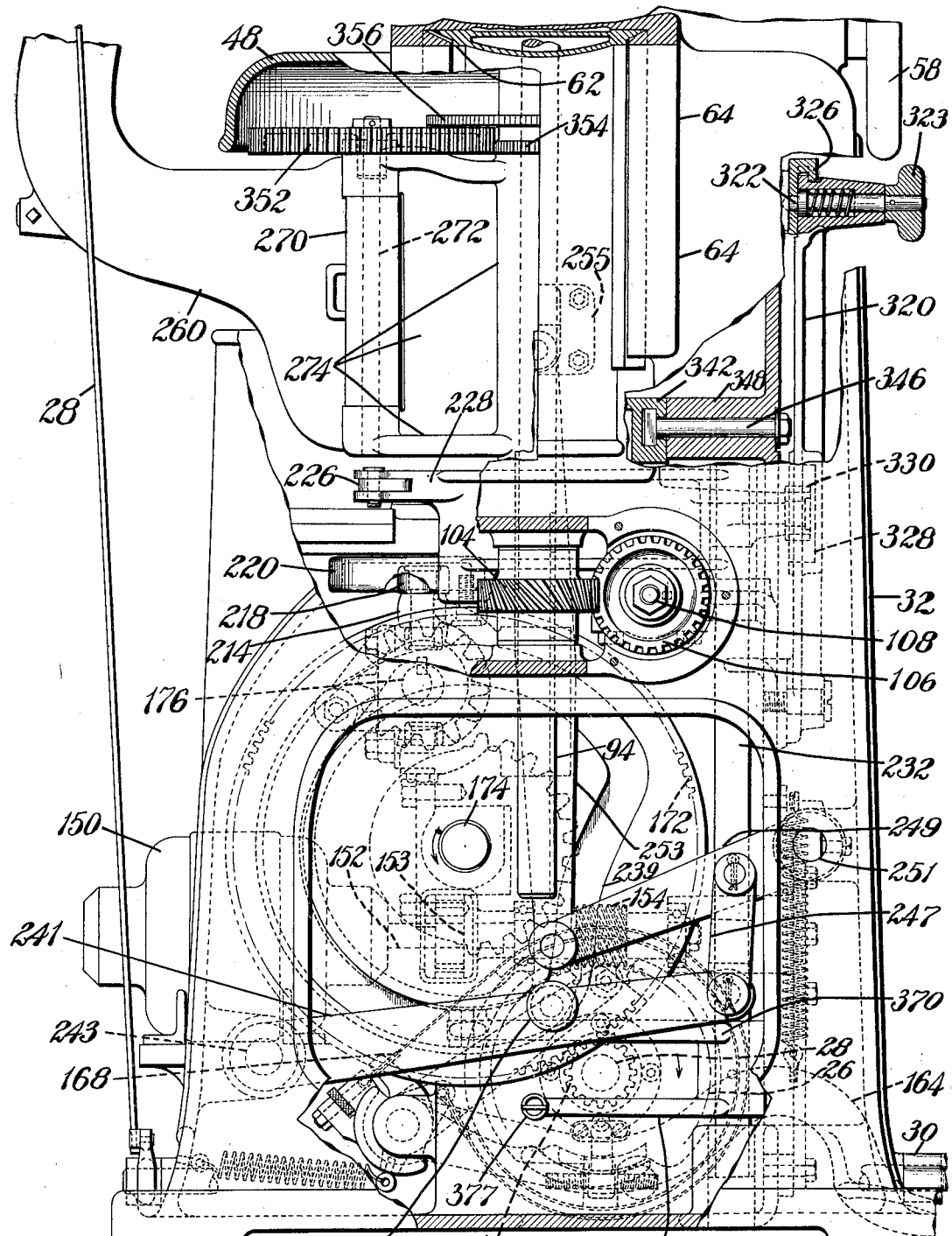
Fig. 2 is a side elevation of the lower part of the machine with parts in section.

The upper clamp 12—14 is supported at the outer end of an overhanging arm 60 extending outwardly from an upright portion 62 which is slidably mounted in a guide standard 64 at one side of the box-like frame 32 (see Fig. 2). Up-and-down movement is imparted to this upper arm 60 by means of a cam to be later described, by means of which said arm is brought to a raised position at the completion of a cycle and when the machine is started is lowered to bring the upper clamps against the shoe and to push the shoe down into the field of operation of the tool. After the cycle has been completed the arm 60 is raised to bring it back to its original position and to unclamp the shoe. The upper clamp 12—14 is capable of sliding adjustment on a cross-rod 66 which is pivoted at its center on a slide block 68 carried in an inclined channel 70 secured to the lower end of a rotatable stud 72 journaled in the outer end of the arm 60. A spring 74 within the channel 70 tends to hold the block 68 in the position shown in Fig. 1, but allows displacement thereof when the shoe is rocked. The shoe supporting plate 16 forming the lower clamp is a removable and replaceable casting the size of which suits the run of shoes to be treated. Several of these castings will be provided as for children's, for women's and for men's shoes, respectively, and each of the castings has a toe and heel supporting portion and a flat central plate 76 which rests upon the flat upper surface of a block 78 (Fig. 14) which is secured by a drive fit in the upper end of a driven sleeve 80. The clamp plate 16 and the sleeve 80 are constantly urged upwardly and are adapted to be raised by a spring 82 when permitted by the position of the upper clamp 12—14. The shoe supporting plate 16 is positioned laterally on the block 78 by side flanges 83 engaging the sides of the block 78 and lengthwise by means of a pair of cross-bolts 84 and 86. The forward cross-bolt 84 is located under a hooked portion 88 of the block 78 while the other cross-bolt 86 drops into a recess limited by an upright surface 90 in said block 78. This arrangement not only permits the easy removal and replacement of the shoe supporting plate 16 but also allows tilting movement thereof around the forward rod 84.

Shoe rotating mechanism

Turning movement is imparted to the sleeve 80, and hence to the shoe support, by means of a pair of helical gears 92 (Fig. 14) splined to the sleeve 80 and forming part of the chain of driving mechanism. Provision is also made for rotating the upper clamp 12—14 through an upright shaft 94 journaled in the upright portion 62 of the arm 60 and carrying at its upper end a sprocket 96 (Fig. 3) with which there is engaged a driving chain 98 passing over another sprocket 100 which is secured to the upper end of the shaft 72 carrying the upper clamp. This upper clamp shaft 72 is journalled in ball bearings at the outer end of the arm 60 and an idler sprocket 102 is provided in the arm 60 to tighten the chain 98. The upright shaft 94 is rotated in synchronism with the sleeve 80 by means of skew gears 104 and 106 (Fig. 2), the gear 104 being splined on the shaft 94 so as to permit up-and-down movement thereof without disturbing the driving connection. The gear 106 is mounted at the end of a drive-shaft 108 journaled in the frame of the machine and rotated in a manner to be later described.

Shoe rocking mechanism

Tilting movement is imparted to the shoe by means of an upright rod 110 (Figs. 1 and 14) carried within the sleeve 80 and provided at its upper end with a head 112 which is seated in a rectangular recess 114 in the block 78 so that it is forced to turn with said block and hence with the shoe. The head 112 is slotted to receive a roller 116 which, when the rod 110 is lifted, is brought to bear against the bottom side of the central plate 76 of the lower clamp 16 to raise said clamp plate 16 and tilt it around the cross-bolt 84. The tilting movement is carried out in time relation to the rotation of the shoe by means of a fixed cam 120 at the bottom of the machine which is bolted to a bracket 122. On the upper surface of the cam 120 rides a roller 124 (Fig. 14) secured on an arm 128 of a cylindrical block 126 mounted on the lower end of the upright rod 110. To avoid any possibility of twisting strain in the upright rod 110, the arm 128 which carries the roller 124 fits in a notch provided at the lower end of a sleeve 130 which is journaled in a bushing 132 in the frame 32 and the upper end of the sleeve 130 is splined at 134 to the double spiral gear 92 by means of which the shoe supporting sleeve 80 is driven.

Between the sleeve 130 and the inner driving sleeve 80 there is a spline 136. It will be seen that the driving sleeve 80 receives power from the double spiral gear 92 first through the spline 134 to the sleeve 130 and thence through the spline 136 to the driving sleeve 80. Inside of the sleeve 130 is a collar 138 which is pinned to said sleeve and which serves to support the lower end of the spring 82 by means of which the lower shoe support 16 is lifted. A bushing 140 is interposed between the upper end of the driving sleeve 80 and the upper end of the sleeve 46. Another bushing 142 is interposed between said parts at the lower end of the sleeve 46. Between the lower end of the sleeve 46 and the surrounding double spiral gear 92 is another bushing 144. It will be seen, therefore, that the sleeve 46 which is supported in the frame parts 48 and 50 provides a support for the rotating sleeve 80 and for the gear 92.

Drive elements

The machine as illustrated is driven by power supplied from an electric motor 150 (Fig. 2) having a shaft 152 which transmits power through a pinion and annular gear 153 to an aligned shaft on which is mounted a worm 154. This worm meshes with a worm gear 156 (Fig. 1) directly connected to the driving half 160 of the clutch. This clutch is of the one-revolution type and is substantially like the construction shown in Letters Patent of the United States No. 1,011,903, granted December 19, 1911, upon an application of Arthur Bates. The driven half 162 of the clutch is keyed to a clutch shaft 158 and when a starting treadle 164 is depressed the two parts 160 and 162 are locked together for a single rotation. Their engagement will be interrupted by means of a knock-off lever 166 acting automatically to apply a band brake 168. Carried on the clutch shaft 158 is a pinion 170 which meshes with a large gear 172 keyed to a cam shaft 174. An internal cam face for operating the knock-off lever 166 is provided on the outside lateral surface of said gear 172.

Intermittent gear drive

Figure 7:
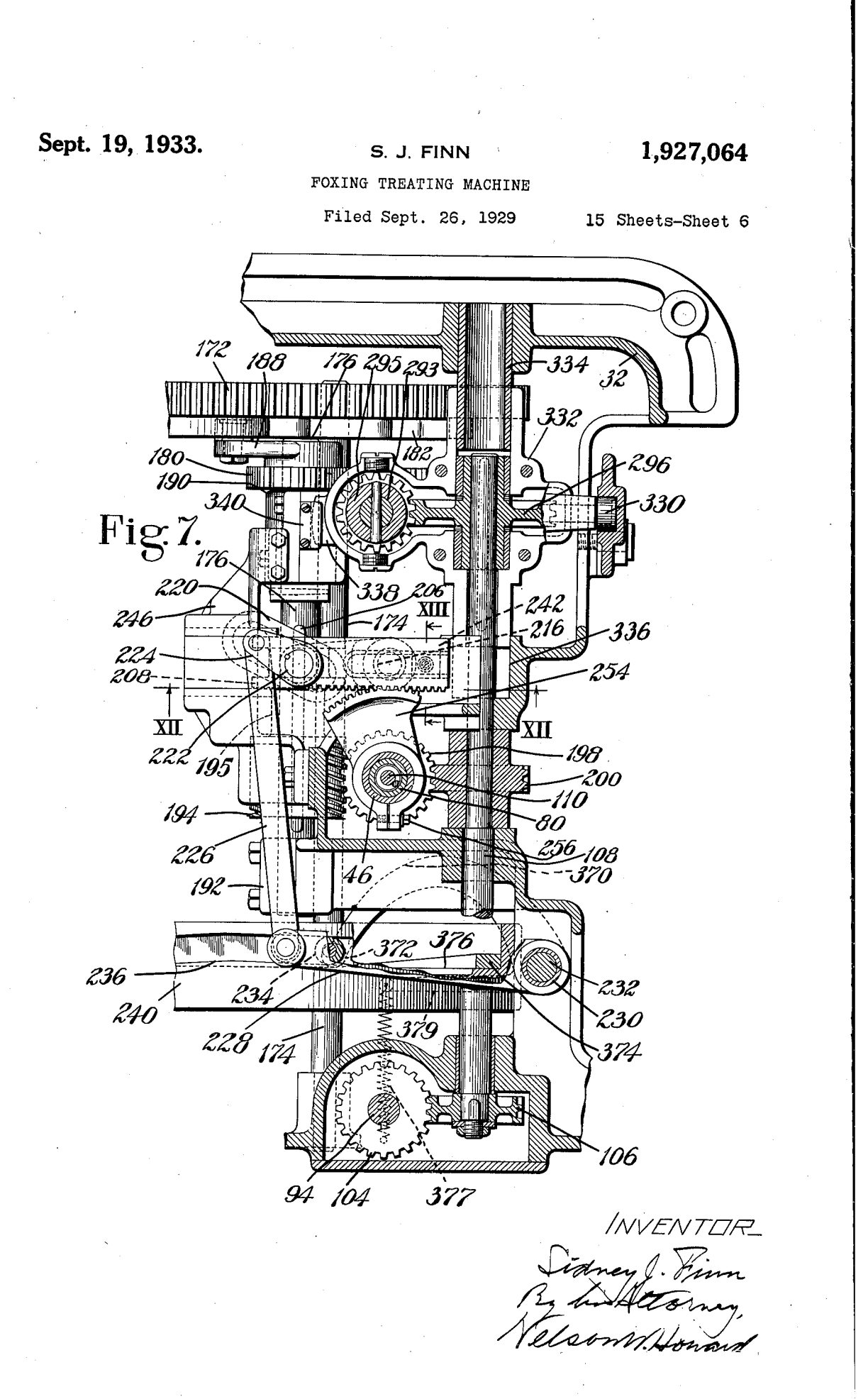
Figure 11:
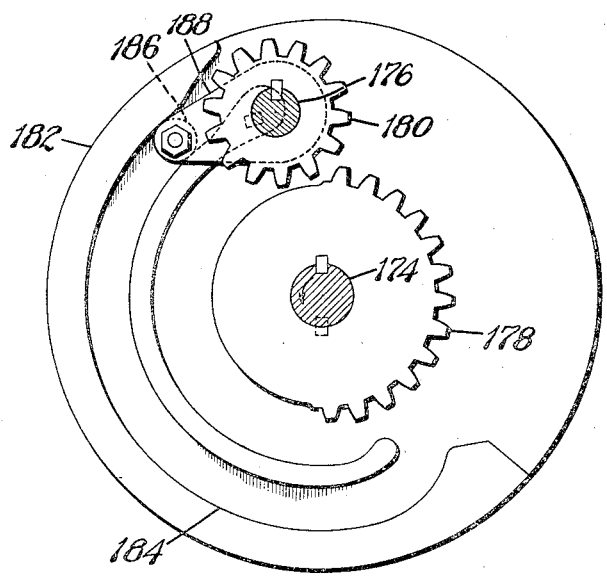
Fig. 11 is a vertical section on the line XI—XI of Fig. 1 to show in elevation the intermittent drive gears.

Means involving an intermittent gear is employed for giving a constant angular velocity to the shoe and at the same time confining the time of its rotation to about two-thirds of the cycle of the cam shaft. This allows time intervals before and after the rotation of the shoe for other power operations such as jacking the shoe, backing off the tool-carrying arm and returning the shoe to the starting point. Power to operate the machine is transmitted from the cam shaft 174, on which the large gear 172 is mounted, to a jack shaft 176 by means of a mutilated or intermittent gear 178 carried on said cam shaft 174 (Fig. 11) which meshes with a pinion 180 on said jack shaft 176. In order to avoid the shock which would result from the contact of the end tooth of the intermittent gear 178 with the pinion 180, there is provided a cam 182 attached to the inside of the large gear 172 (Figs. 7 and 11) which cam has a partial cam track 184 to receive a roll 186 carried on the end of a short arm 188 which is keyed to and rotates with the pinion 180. The cam track 184 is so designed that it gives a slight acceleration to the pinion 180 just before the end tooth of the intermittent gear 178 contacts therewith and when the action of the intermittent gear 178 is finished it decelerates the pinion 180 in much the same fashion. On this jack shaft 176 which carries the pinion 180 and which is journaled in bearings 190 (Fig. 7) and 192, provided in the frame of the machine, is splined a worm 194 which meshes with the lower toothed portion 196 of the double spiral gear 92 (Fig. 14) carried on and driving the upright sleeve 80. Through this connection power is provided for rotating the lower shoe clamp 16. The upper toothed portion 198 of this double spiral gear 192 meshes with a spiral gear 200 which is keyed on the drive shaft 108 also journaled in the frame of the machine and carrying at its extreme left-hand end the skew gear 106 which meshes with a similar skew gear 104 on the upright shaft 94, as shown in Figs. 2 and 7. Through this connection a drive is provided for the upper shoe clamp 12—14.

Thus in general the power supplied by the electric motor 150 is transferred through the motor shaft 152 to the clutch shaft 158 which is connected by gears to drive the cam shaft 174. This in turn provides an intermittent drive for the jack shaft 176 which is directly connected by the worm 194 and spiral gear 196 to the upright sleeve 80 carrying the lower shoe clamp 16. A continuation of this gear connection through the gears 198, 200 to the drive shaft 108 provides for a supply of power to the upright shaft 94 by means of which the upper shoe clamp 12—14 is rotated in synchronism with the lower clamp.

*Foxing overlap mechanism*

Figure 12:
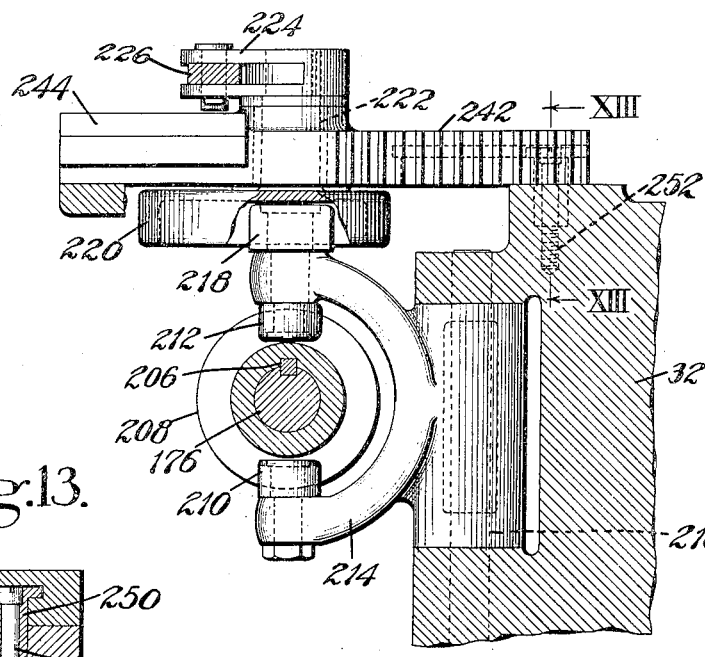
Fig. 12 is a transverse vertical section on the line XII—XII of Fig. 7 to show part of the overlap mechanism.
Figure 13:
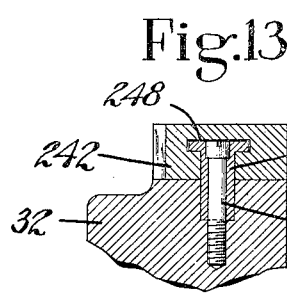
Fig. 13 is a detail in vertical section on the line XIII—XIII of Fig. 12.
Figure 27:
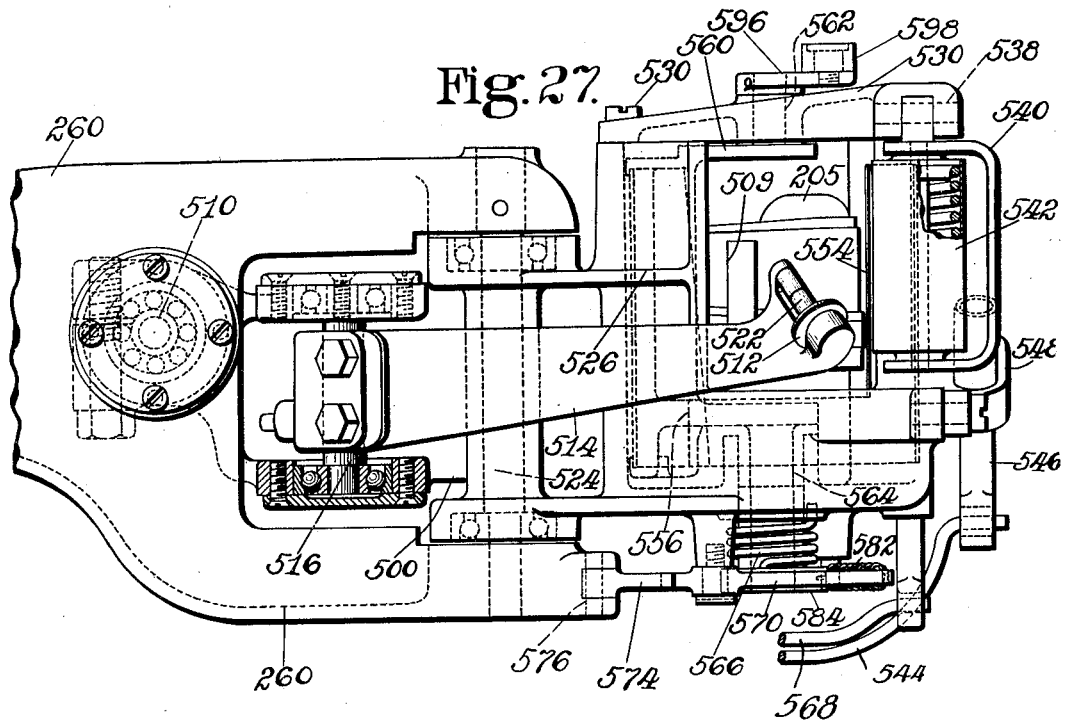
Fig. 27 is a side elevation of the foxing laying tool with the outer end of its carrying arm.
Figure 28:
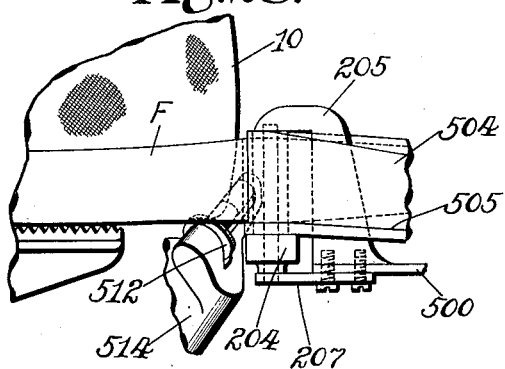
Figs. 28 and 29 are detail elevations of a portion of a shoe and the foxing applying roll at the heel end and the shank of the shoe respectively.

It is common shoe factory practice in the manufacture of rubber-soled shoes of the tennis type so to apply the foxing strip that the ends overlap. Some manufacturers overlap the ends of the strip at the inside of the shoe and others at the rear of the shoe. When the illustrated machine is used for applying foxing it is arranged to overlap the ends of the foxing strip at the rear of the shoe so that each end of the strip lies equally distant from the extreme end of the shoe upon opposite sides thereof. The overlap mechanism now to be described is arranged to control the rotation of the shoe so that the shoe may be rotated any desired amount from one complete revolution, at which point of adjustment there will be no overlap, to an adjustment in which the ends of the strip overlap each other by several inches. Adjustment is effected by rotation of the hand wheel 58 used for varying the angular position of the shoe locating elements. It should be noted that rotation of this hand wheel 58 also causes a rotation of the shoe support or clamps (in a manner to be later described) and thus enables the operator to see by inspection just where the overlap will start by noting the position of a foxing applying roll 204 (Fig. 3) with respect to a shoe thus angularly displaced with respect to the frame 32. In considering the shoe shown in outline in Fig. 3 the operator may adjust the hand wheel 58, for example, so that the applying roll 204 is opposite the point A on the shoe. If the machine is started with the shoe in this position the overlap mechanism will be effective automatically first to carry the shoe counterclockwise so that the applying roll is opposite the point B to start laying a foxing strip F. The point B is equidistant with the point A from the extreme rear end C. This movement takes place before the foxing laying tool including the applying roll 204 is brought into contact with the shoe. After this, the tool having been brought up, the shoe is given a complete rotation clockwise and in addition a fractional rotation sufficient to bring the applying roll to the point A. The mechanism is arranged to superimpose this additional turning movement upon the turning movement provided by the normal driving mechanism which would of its own accord turn the shoe for one complete revolution. The additional movements to produce the overlap are imparted through the worm 194 (Fig. 7) of the normal driving mechanism, without in the least disturbing the connections of that mechanism, by sliding said worm 194 along a spline 206 on the jack shaft 176. The worm 194 is extended at 195 and has integral with it a grooved collar 208. Extending into the groove of this collar at opposite sides thereof are rolls 210 and 212 (Fig. 12) carried by a forked member 214 pivoted on an upright stud 216 which is mounted in a portion of the frame 32 of the machine. At the upper end of this forked member 214 is provided a roll 218 received within a hollow cam 220 having parallel spaced sides and integral with the lower end of an upright stud 222. Carried on and keyed to the upper end of this stud is a forked crank 224 joined by a long link 226 (Fig. 7) to a cam lever 228. The cam lever 228 has a broad upright web for rigidity (Fig. 2) and is pivoted about a fixed point, being actually mounted upon a sleeve 230 surrounding an upright rod 232 which is journaled in the frame of the machine and is utilized, as will be later described, for an entirely separate purpose. The lever 228 carries on its under side a cam roll 234 working in a cam track 236 formed about the periphery of a cam 240 which is mounted on the left-hand end of the cam shaft 174, as seen in Fig. 1. The cam track 236 is so designed as to give the crank 224 on the hollow cam 220 a sharp quick movement from the position indicated in Fig. 7 to a lower position an amount angularly equally distant from the horizontal line through the center of the stud 222. The cam track then operates to return the crank 224 and with it the cam 220 to the position shown in Fig. 7. As shown in Fig. 7 the parts are so located that the cam roll 218 on the forked member 214 is directly below the pivot stud 222 of the hollow cam 220. Consequently no sliding movement will be imparted to the worm 194 with the parts in this adjusted position. However, the upright stud 222 carrying the hollow cam 220 is pivoted in a slide 242 which is cross-shaped at its left-hand end 244 and is received within a correspondingly shaped guideway formed in a bracket 246 bolted between the bearing member 190 and the frame 32. The right-hand end of the slide 242 is provided with a T-slot 248 as shown in Fig. 13 to receive a block 250 secured by a screw 252 to the frame 32 of the machine. The side of the slide 242 is provided with a rack meshing with a segment 254 clamped by a bolt 256 (Fig. 14) to the outer sleeve 46 surrounding the upright shoe rotating sleeve 80.

It will be recalled that the toothed flat plate 52 (Fig. 3) mounted on the bracket 42 which carries the locating arms is also clamped to the sleeve 46 and that the position of this plate 52 and hence the position of the bracket 42 is determined by adjustment of the hand wheel 58. Thus to control the overlap mechanism, the slide 242 is operated by the same hand wheel 58 which positions the shoe locating arms (and, as will be seen, the shoe clamps). Thus if the slide 242 is adjusted to the right in Fig. 12 and Fig. 7, then when the machine is started the rotation of the cam 240 along with the other mechanism of the machine will act through the hollow cam 220 to slide the worm 194 first in one direction from its normal position, this movement taking place rather quickly, and then will slowly bring it back to its normal position, thus superimposing on the normal rotation of the shoe holding clamps a movement such as that set forth previously to cause an overlapping of the ends of the foxing strip S from the point A to the point B. Since this overlapping is symmetrical with respect to the back of the shoe it is correct for either rights or lefts. This superimposition of one movement on another is permitted by the well understood relation of the worm 194 and the spiral gear 196 operating about axes at right angles to each other. A sliding movement of the worm 194 will turn the gear 196 quite regardless of the rotational movement imparted to said gear 196 through the rotation of the worm 194.

It is also by virtue of these connections that the operation of the hand wheel 58 is effective to move the upper and lower shoe clamps with the shoe centering devices 18, 20. This will be better understood by considering the parts shown in Fig. 7. If the operator turns the hand wheel 58, in moving the plate 52 connected directly to the locating members, he will also cause a rotation of the segment 254 which will move the slide 242 to the right, for example, and dragging the hollow cam 220 along the roll 218 which is attached to the forked member 214 will cause said forked member to swing and thereby to slide the worm 194 along the jack shaft 176 to turn the gear 196 of the double spiral gear 92 and hence through the connections previously described to turn both the upper and the lower shoe clamps.

Raising the upper shoe clamp

A cam track 239 on the left-hand side of the cam 240 is utilized for raising the upper shoe clamp supporting arm 60. To this end a lever 241 (Fig. 2) is pivoted at 243 upon the frame and is provided with a cam roll 45. The outer end of this lever 241 is connected by an upright link 247 to another lever 249 pivoted at 251 in the frame of the machine. The other end of this lever 249 is connected by a long upright link 253 to the bracket 255 (Fig. 1) attached by bolts to the inner side of the upright slide 62. The cam track for actuating the lever 241 is designed to pull down on the arm 60 when the treadle 164 is depressed, to depress the shoe and the lower clamp 16 against the tension of the spring 82. This operates to push the shoe below the level of the centering devices 18 and 20 and brings the foxing area 11 of the shoe opposite an operating tool.

Compensating mechanism

Inasmuch as the shoe is rotated about its central axis at a constant angular velocity, the tool, for example the tool part called the foxing applying roll 204, which is carried at the outer end of a swinging arm 260 would operate along parts of the shoe having a varying radius and consequently the tool would move along the foxing area of the shoe at a varying speed. To overcome this, a compensating mechanism is provided by means of which a spindle 262 (Figs. 1, 8 and 9), upon which the C-shaped tool carrying arm 260 is pivotally mounted, is made to follow a path (herein shown in Fig. 4 as an elongated ellipse 264) such that in combination with the rotation of the shoe it will give an approximately uniform progressive movement of the tool relative to the shoe.

The compensating mechanism is also arranged and designed to maintain the drag of the work arm 260 substantially constant and at a small acute angle from a tangent to the shoe at the point of contact between the tool and the shoe. This arrangement maintains the various auxiliary members associated with each of the tools, and to be later described, in proper relation to the shoe. If the arm 260 were mounted on a fixed pivot and held by a spring in contact with the shoe the angular relation between the arm and the shoe would be disturbed most when the tool progressed around the toe or the heel of the shoe. The compensating mechanism herein illustrated and described acts to accelerate relative progressive movement between the side of the shoe and the tool at the heel and toe ends and embodies the principle of the corresponding very similar mechanism shown and described in Letters Patent of the United States No. 1,863,747 for improvements in foxing applying machines to which reference has been made above.

Referring now to Figs. 5, 6, 8, 9 and 10 with occasional reference to Figs. 1, 2 and 14, it is seen that the spindle 262 upon which the C-shaped arm 260 swings on ball bearings is carried at the outer end of a toggle (Fig. 5) comprising a triple webbed hinge member 270 (Fig. 8) joined by pivot pin 272 to another hinge arm 274, the hub of which surrounds and rotates freely upon the outer sleeve 46 (Fig. 14). The arm 260 is urged to swing clockwise about the hinge member 270, as viewed from above (Fig. 9), by a spring 261 connecting said hinge member 270 and the arm 260. The hub of this arm 274 is positioned vertically upon that sleeve by a frame member 50 and a collar 276 which is pinned to the sleeve 46. Because of the considerable vertical extent of each of the hinge members 270 and 274 of this toggle a very considerable rigidity is imparted to the spindle 262 to avoid tipping thereof from the vertical. The position of the spindle 262 in a horizontal plane is determined jointly by a double link 278 extending between the spindle 262 and a shiftable center pin 280, and by an eccentric operated link 282. The shiftable center pin 280 is carried in an arm 284 (Fig. 5) projecting laterally from a plate 286 one end of which (the lower end in Fig. 5) slides in a box 288 (Fig. 10) formed at the upper end of an adjustable pivot 290. The other end of the plate 286 is journaled on a crank pin 292 carried by the lower arm 291 of a double crank 294 on an upright shaft 293 (Fig. 7) and rotated by a worm 295 meshing with a worm gear 296 splined on the drive shaft 108. The design is such that the crank 294 is rotated twice for each rotation of the shoe. The double crank 294 has an upper arm 298 integral therewith, and positioned, as shown in Fig. 6, at a substantial angle from the crank arm 294. A housing 300 slotted above and below at 302 to receive square blocks 304 loosely journaled on the upright spindle 262 is pivoted at its other end upon a pin 306 carried by said upper crank arm 298. The pin 306, bolted and keyed to the crank arm 298, carries integrally at its upper end within the housing 300 a gear 308 which meshes with another smaller gear 310 loosely pivoted on a pin 312 secured in the housing 300. The gear 310 has integral with it an eccentric 314 surrounded by the strap of the eccentric link 282. Thus at each rotation of the drive shaft 108 the double crank 294 will be rotated twice to give two complete reciprocations to the slide 286 carrying the movable center pin 280 and to impart two complete orbital movements to the gear 308 which is keyed to the crank. This in turn will impart two complete reciprocations to the eccentric link 282 and the combined effect upon the tool carrying arm spindle 262 will be to move said spindle along the elongated path 264 of Fig. 4.

The compensating mechanism herein illustrated and just described in part has the additional advantage that it may readily be adjusted by means of a hand lever 320 pivoted at its lower end on the frame of the machine. By adjustment of the hand lever 320 from one position to another the compensating mechanism is enabled to care more readily for shoes of different sizes and more particularly for shoes of different ranges such as men's, women's and children's.

The lever 320 is provided at its upper end with a spring-pressed locking pin 322 (Fig. 2) operated by a handle knob 323 so that it may be secured in any one of a plurality of adjusted positions determined by recesses 324 (Fig. 8) in the outer casing of the frame of the machine and an overhanging lip 326 (Figs. 2 and 8) cooperates with the upper end of the lever to avoid deflection thereof. At an intermediate portion of the lever there is provided on its rear side a groove 328 receiving a roll 330 carried on a housing 332 (Figs. 1, 5, 7 and 8). The housing surrounds and slides upon a sleeve 334 (Fig. 7) carried in the frame 32 of the machine which is coaxial with the drive shaft 108. At its other end the slide 332 has a bearing in a suitable recess 336 cut in the frame of the machine. This housing 332 encloses the gear 296 which is splined on the drive shaft and the meshing gear 295 pinned to the vertical shaft 293 of the double crank to adjust the position of the elongated path 264 with respect to the center of rotation of the shoe support so that the machine will readily care for shoes of radically different sizes. This is done in the illustrated construction by varying, with said lever 320, the center of rotation of the double crank 294 and the driving mechanism therefor, and also by moving the pivotal support for the end of the sliding plate 286. The housing 332 is provided with a tail 338 (Fig. 7) sliding underneath a gib 340 which is screwed to the bearing block 190 to prevent rotation of the housing around the center of the drive shaft 108.

It will be noted from Fig. 8 that the slidable housing 332 also has an upwardly extending arm 342 which has a T-shaped slot 344 to slide on the head of a bolt 346 extending into a post 348 (Fig. 5) on the frame of the machine near the outer end of this arm 342. This arm 342 on the housing 332 provides a support for the pin 290 (Fig. 10) which serves as a pivotal guide for the outer end of the sliding arm 286. Thus by an adjustment of the slidable housing 332 by means of the hand lever 320 the operator moves not only the pivot of the double crank 294 but also the pivotal support 288, 290 slidably supporting the outer end of the arm 286 and these adjustments take place in synchronism.

Backing-off mechanism

Since the machine is intended to operate upon shoes of radically different sizes which are rotated around a fixed vertical axis and since the tool is supported on a swinging arm 260 which is spring-pressed to carry it into engagement with the shoe, it will be seen that there may be a wide distance between the stopping point of the tool on a large size shoe and the point of engagement of the tool with the next shoe which may be only a child's shoe. Provision must also be made for moving the tool away from the shoe at the completion of the operation and holding it, against the tension of the spring 261, to permit removal of the shoe and its replacement by another. Accordingly, there is provided a backing-off mechanism shown in Figs. 1, 5 and 16, which is arranged to rotate the tool-carrying arm 260 around its spindle 262 at the completion of a cycle to carry the tool a few inches away from the completed shoe and then at the beginning of a cycle to bring it gently against the next shoe which is positioned in the machine. Accordingly a small gear 350 (Figs. 5 and 9) is secured by screws to the tool-carrying arm 260 directly in line with the spindle 262. Meshing with this gear is a large loose idler 352 which is pivoted on the hinge pin 272 between the toggle arms 270 and 274 and this idler meshes with the teeth of a smaller gear 354 loosely pivoted on the sleeve 46 (Fig. 14) which surrounds the axis of rotation of the shoe. This gear 354 is integral with a ratchet 356 which is engaged at intervals by a cam controlled member to move the tool away from the shoe and later upon the commencement of a succeeding operation of the machine to bring the tool gently against the shoe. To this end a pawl 358 is provided which is pivotally mounted at the outer end of an arm 360 and pressed by a spring 362 toward the ratchet. The arm 360 has a hub 364 which, as may be seen in Fig. 14, is directly above the ratchet 356 and which swivels on the sleeve 46 as does the ratchet. Secured to the arm 360 is a link 366 connected to a lever 368 which is secured to the upper end of an upright rod 232 pivoted in bearings on the frame of the machine. On the lower end of this rod is mounted a cam lever 370 (Figs. 2 and 7) having a cam roll 372 to engage an open cam track formed by inserts 374 placed within a recess 376 formed in the right side of the cam 240 (Fig. 1) which is at the left-hand end of the cam shaft 174. A spring 377 between the frame and an arm 379 integral with the cam lever 370 holds the roll 372 against the inserts 374. Thus for every rotation of the cam shaft, which corresponds with one rotation of the shoe, the cam lever 370, and hence the upper lever 368, is given a complete oscillation to carry the pawl 358 counterclockwise around the center of the sleeve 46, as viewed in Fig. 5, to move the tool away from the shoe and then clockwise to allow the tool to be carried inward against the shoe under the tension of the spring 261.

By properly shaping the cam movement away from the shoe may be carried out rapidly and movement into engagement with the shoe made as gentle as desired.

It will be remembered that the tool-arm-carrying spindle 262 which is concentric with the small gear 350 moves over a closed path 264 which path of itself may be positioned in radically different sections of the top of the machine. The spindle 262 is given its major support by the toggle arms 270, 274 and is guided by the compensating mechanism. The idler gear 352 interposed between the gear 350 on the tool carrying arm and the gear 354 on the ratchet 356 insures the constant connection of the gear 350 and the ratchet 356 regardless of the position of the spindle 262. Provision is made then for keeping the pawl 358 out of engagement with the ratchet 356 until a predetermined point in the cycle of the machine has been reached so that it will back the tool off a fixed distance regardless of the movements of the tool carrying arm or the size of the shoe being treated. To this end the machine is provided with a fixed shield 380 depending from the cover portion 48 of the frame of the machine and with a swinging shield 382 depending from the rear side of an arm 384 pivotally mounted at 386 on the top cover 48 and having at the extreme end of the shield 382 a pivoted spring-pressed flap 388. The pawl 358 is provided with an upwardly extending cam roll 390 which rides over the fixed shield 380 and the swinging shield 382 and pushing the flap 388 aside allows the point of the pawl 358 to drop against the ratchet 356. During the remaining movement of the pawl carrying arm 360, the ratchet 356, and hence through the connections described, the tool-carrying arm 260 is swung around its spindle 262 to back the tool off from the shoe.

When the machine is started again the cam control for the swinging pawl carrying arm 360 brings the cam roll 390 against the other side of the flap 388 and swings the shield 382 away from the ratchet, allowing the tool on the tool-carrying arm 260 to be brought gently under the tension of the spring 261 against the side of the shoe. As soon as the cam roll 390 on the pawl 358 has been retracted far enough it rides up on the shield 380 leaving the tool held by the spring 261 against the shoe. The roll 390 remains in that position until the time after the shoe has completed its rotation and it is necessary for it to again move forward to back the tool off from the shoe. This action is regardless of the size of the shoe and always moves the tool a fixed amount away from the shoe. If a larger shoe is placed in the machine after work has been carried out on a small shoe then the operator simply pushes the tool aside to permit the mounting of the shoe by manually engaging a handle 392 (Fig. 3) on the tool carrying arm.

Cementing elements

When the machine is arranged for applying cement to the foxing area 11 of the shoe 10 a shallow cement receptacle 400 (Fig. 4) is positioned on the top cover 48, being formed integrally with the bracket 42. This receptacle is provided with a central boss 402 for the passage of the shoe clamp carrying shaft 80 so that the shoe may be positioned and rotated above the receptacle. The cement-applying tool (Figs. 18 and 25) is mounted upon a tool carrying arm 260a similar to the arm 260 already described. This arm 260a is provided with a pivoted extension 404 (Figs. 18 and 23) pivoted on a spindle 406 and normally held in substantially horizontal position with its weight balanced by a spring 408 (Fig. 18). This extension 404 carries at its outer end an upright framework 410 in which is provided a bearing for a stub shaft 412 (Fig. 19) used for supporting a rotatable pick-up disk 414 having a plurality of grooves 416 around its periphery. The stub shaft 412 has an integral collar 418 (Fig. 20) to which is attached by screws a gear 420. This gear meshes with a pinion 422 on another shaft 424 to which there is connected one end of a flexible shaft 426 passing over a hook 428 (Fig. 23) on the arm 260a and connected by means (not shown) to one of the shafts of the machine so as to rotate the disk 414 during the operation of the machine. The disk 414 is connected to the collar 418 by means of a driving pin 430 and is detachably held on the end of the stub shaft 412 by a removable spring cotter pin 432. This allows the ready removal of the disk 414 for cleaning.

Between the disk 414 and the gears 420, 422 is a cover 434 which may be removed to give access to said gears. A packing ring 436 is interposed between a hole at the center of the cover 434 and the edge of the integral collar 418 to prevent cement from working into the gear case. Another cover 438 surrounds the connection between the flexible shaft 426 and the pinion shaft 424. The casting of the framework 410 also extends around the margin of the wheel at the front thereof to provide a trough 440 (Figs. 19 and 21) over which flows cement picked up by the disk 414 and transferred to said trough by flexible steel scrapers 442 screwed at one end to the trough and each substantially filling one of the grooves 416 of the disk. Thus the constantly driven disk 414 picks up cement from the receptacle 400 and causes it to flow down the trough 440 to be deposited onto the foxing area 11 of the shoe.

It is essential to the proper operation of the machine that the cement shall exactly cover the foxing area without extending above the upper margin thereof and accordingly a curved shield 444 is mounted directly above the trough 440 and provided with a curved forward end, as shown in Fig. 23, which is sufficiently sharp to form a distinct line of division between the foxing area and the rest of the upper of the shoe without being sharp enough to damage the shoe.

Preferably the pressure of the cement-applying tool against the shoe as effected by the spring 261 is such as to cause the forward edge of the shield 444 slightly to indent the canvas cover to form a crease and thereby to prevent spreading of the cement above the foxing area by capillary action. This shield 444 is an extension of a curved cover member 446 which is pivotally mounted on the frame work 410 by means of a removable pin 448. The shield 444 is pivotally attached to the extension 446 by a transverse pin 449 and by threaded pins 450 and 451 carrying winged nuts 452 and 453. The pin 451 rests in a groove 454 in the frame work so that the shield 444 and extension 446 as a unit may be tipped up around the removable stud 448 to give access to the disk and scrapers and to permit the removal of the disk 414.

It will be obvious that some portions of a shoe have a sharp corner at the lower margin while other portions of the shoe are undercut as at the shank. At such places, as illustrated in Fig. 25, a flow of cement directly down from the point of contact of the shield 444 with the shoe would not deposit any cement on the shoe. Accordingly, a hinged wiper 456 is provided which is pressed upwardly against the bottom of the shoe by a coiled spring 458 (Fig. 22) surrounding its pivot pin 460. This wiper 456 constitutes in effect an extension of the trough 440 and forces the cement to cover the whole width of the foxing area even in those portions which are undercut, such as at the shank. The wiper 456 is mounted on a thin plate 462 positioned directly under the lower edge of the trough and mounted for swinging movement about an upright pivot pin 464. To this end the plate 462 is screwed to a small casting 466 journaled on the pivot pin 464 and is allowed to give slightly against a surrounding spring 468. The pivot pin 464 extends into the upright frame work 410 upon which the other parts of the tool are mounted.

It will be recalled that means are provided for tilting the shoe about the ball line so as to bring the toe portion of the foxing area to approximately the level of the heel portion thereof. This arrangement to a large extent compensates for the differences of level between different parts of the foxing area but does not take into account the arched shank portion of the shoe or any other slight variations in level. Accordingly, means are provided for guiding the tool around the shoe so that the edge of the shield 444 will travel exactly along the upper edge of the foxing area. To this end, the extension arm 404 has attached to it a control arm 470. This arm 470 is clamped by a screw 472 (Fig. 18) on an upright pivot pin 474 mounted in ball bearings in the extension arm 404. A spring 476 interposed between the extension arm 404 and the control arm 470 thrusts the outer end of the control arm toward the shoe to a limit defined by an adjustable stop screw 478 held in adjusted position by a lock nut 480. On the outer end of the control arm 470 there is provided an upright pin positioned at a compound angle with respect to the shoe (see Figs. 19 and 23) and on this pin is mounted for free rotation a thin disk 482 surmounted by a roller 484. The utility of this arrangement will be best understood by a consideration of Figs. 24 and 25 from which it will appear that the disk 482, the edge of which may be serrated if desired, is held against the bottom of the shoe and tends always to drag the roller 484 into contact with the corner of the shoe whether it be a sharp corner as in Fig. 24 or a curved shank portion, such as is illustrated in Fig. 25. By this contact between the disk 482 and the bottom of the shoe the control arm 470 is forced to swing up and down and to carry with it the extension arm 404 for movement around the horizontal pivot pin 406. This carries the edge of the shield 444 up and down so as to follow exactly the upper edge of the foxing area and to coat a portion of uniform width considered vertically around the periphery of the shoe, thus contributing very materially to the successful operation of the machine.

In order that the width of the stripe of cement to be applied to the shoe may be varied to meet the wishes of various shoe manufacturers, the upright framework 410 carrying the cement supplying disk 414 and the shield 444, as well as the trough 440, may be adjusted vertically on the extension arm 404. To this end a dove-tail rib 486 (Fig. 23) is provided at the end of the extension arm 404 and a corresponding groove provided in the upright framework 410 so that said framework may be adjusted vertically on the arm 404 by means of a screw 488 threaded into the rib 486 and having a head 489 mounted against axial movement in a cover 490. When the screw 488 is rotated in the cover 490 it lifts or depresses said cover and the framework 410 to which the cover is secured by screws. This adjustment does not affect the position of the control arm 470 and therefore varies the relation of the edge of the shield 444 to the bottom of the shoe so as to apply a wider or narrower stripe. A lock screw 492 bears against a gib 494 to clamp the framework in adjusted position on the dovetail rib 486.

At the close of a day's work the shield 444, and the extension cover 446 may be swung clockwise (Fig. 19) around the pin 448 and, if desired, removed from the machine for cleaning by pulling the pin 448 out of the framework. The removal of the cotter pin 432 permits removal of the disk 414 after the spring scrapers 442 have been lifted out of the grooves in the margin of the disk. The narrow deep grooves 416 in the margin of the disk pick up considerable quantities of cement from the receptacle 400 and deliver it to the trough 440 where it flows onto the foxing area of the shoe under the guidance of the shield 444, the wiper 456, and the control arm 470. Any surplus cement removed by the flexible wiper 456 flows back into the receptacle.

*Foxing laying mechanism*

When it is desired to use the machine for applying a strip of gum rubber, commonly called a foxing strip or a foxing, the machine is provided with a laying tool, shown incidentally in Figs. 1 and 3 and in more detail in Figs. 26 to 31, inclusive. Here the arm 260 is provided with an extension frame 500 carrying the laying roll 204 near the extreme forward portion of said frame, and a pulley 502 pivoted on ball bearings at the extreme rear end of the extension frame. The laying roll 204 has a shoulder at its lower end and is supported by brackets 205 and 207 mounted on the frame 500. Over the laying roll 204 and the pulley 502 is stretched an endless carrying belt 504 having a flanged supporting edge 505 which is arranged as in the prior Letters Patent No. 1,863,747 to which reference has been made above. This belt 504 is used to support the foxing strip F, which passes upwardly from a source of supply over the pulley 502, along the upper run of the belt to the applying roll 204. It will be noted that the endless belt is given a quarter turn between the two pulleys and that a guard strip 508 is attached to the frame 500 to assist in holding the foxing strip on the belt 504 and to prevent accidental contact therewith. The forward end of the strip, passing back of a retaining pin 509 and partly around the applying roll 204, is pressed thereby, by reason of the pressure provided by the spring 261 which swings the arm 260, into contact with the shoe to cause it to adhere to the lower margin of the shoe exactly over the foxing area with the upper edge of the strip coinciding with the upper edge of the cement stripe and with its lower margin sometimes extending slightly around the corner of the shoe. As the shoe is rotated the strip is fed forward frictionally and pressed against successive portions of the foxing area by the applying roll 204.

Figure 29:
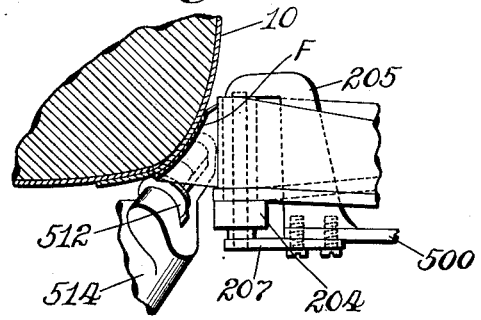

Just as with the foxing cementing tool this foxing laying tool must be guided up and down to cause it to apply the strip exactly at the desired level and consequently the extension framework 500 is mounted on a horizontal pivot 510 carried in ball bearings in the arm 260 and is caused to rock slightly up and down by means of the shoe-contacting disk 512 carried at the outer end of an arm 514. This arm 514 is clamped to a vertical spindle 516 which is mounted in ball bearings in said extension frame 500. A spring 518 stretched between the hub of the arm 514 and an anchor 520 on the frame 500 tends to swing the arm 514 clockwise, as viewed from above, so that it may move in and out horizontally (to a limited extent determined by a stop, not shown) with respect to the applying roll 204 as is necessitated when the disk 512 contacts with undercut portions of the shoe, such as a shank portion, as illustrated in Fig. 29. As with the foxing cementing tool this disk 512 is set on a compound angle and provided with a serrated edge to drag the arm 514 in toward the shoe to an extent determined by the coacting rollers 522 which are mounted on the same pivot as the disk 512 and rotate freely thereon. The rollers 522 contact with the corner of the shoe and, in conjunction with the disk 512 guide the applying mechanism slightly up and down around the spindle 510 as is necessitated by such curvatures of the shoes as are found in the shank portions. At the outer end of the tool carrying arm 260 there is provided another vertical spindle 524 (Figs. 27 and 30) supporting an arm 526 carried on ball bearings thereon. This arm 526 terminates in an upright cylindrical box-like structure 528 cut away at the front and rear sides. On the top of this box 528 is mounted a bracket 530 which is secured by screws 532, 534 and 536. In the outer end of this bracket is a pivot pin 538 from which depends a hanger 540 carrying rotatably therein a pressure roll 542. This roll is of considerably greater height than the laying roll so that it will contact with the shoe regardless of the up and down movement of the extension frame 500, and is made up of a helical spring surrounded by a thin leather cover. The hanger 540 for the pressure roll is pressed inwardly at its lower end by means of a coiled spring 544 connected to a lower end of an arm 546 (Fig. 26) the upper end of which is secured to said hanger 540. This frame arm 546 swings within a hollow guide 548 attached to the side of the box 528 and the action of the spring 544 is to hold the pressure roll 542 always in contact with the shoe up to the limit defined by the hollow guide 548. The coiled spring 544 swinging this pressure roll is mounted at the upper end of an extension 550 (Fig. 1) formed as an integral part of the toggle-like member 270 which carries the spindle 262 on which the tool-carrying arm 260 pivots.

The hollow box 528 being open at the rear provides room for the admission of the forward end of the extension frame 500 carrying the applying roll 204 and the front side of the box is also open to allow said roll to project through it into contact with the shoe. As has been noted, the box 528 is cylindrical in section and secured to one side thereof is a knife blade 552 (Fig. 30) having a cutting edge 554 the length of which is great enough to allow it to cut the whole width of the foxing strip. At the same time the blade 552 is wide enough so that its lower edge is provided with an extension 556 underlapping the swinging knife blade 558 to insure proper shearing action between the blades. The moving blade 558 is arcuate in shape and is carried on a pivoted hanger 560 mounted on an upper pivot 562 and a lower pivot 564 in the bracket 530 and the box 528 respectively. The pivot 564 is extended at its lower end to support a coiled spring 566 tending always to swing the knife in counter-clockwise direction, as viewed in Fig. 30, so as to carry it past the cutting edge 554 and thereby to sever the foxing strip. When the arm 260 carrying the extension frame 500 is moved away from the shoe by the backing-off mechanism the box-carrying-arm 526 is swung, so as to hold the pressure roll 542 in contact with the shoe, by means of a coiled spring 568 (Fig. 26) which is mounted on the upper end of the extension 550 while the other similar spring 544 forces out the pressure roll 542. This varies the relative positions of the box 528 and the applying roll 204 to the position illustrated in Fig. 31 where the foxing strip, which has been attached to the shoe, passes across an open space between the shoe and the applying roll in which space is located the path of the swinging blade 558. This retrograde movement of the frame 500 with respect to the arm 526 is effective to actuate a latch 570 hooked in a notch in a disk 584 on the lower end of the pivot 564 to release the swinging blade 558 and cause it to sever the foxing strip. This cutting off action is so timed that it takes place prior to the completion of the rotation of the shoe and, accordingly, permits the pressure roll 542 to press the loose end of the foxing strip into contact with the shoe in overlapping position, as previously described and as shown in Fig. 3.

Figure 31:
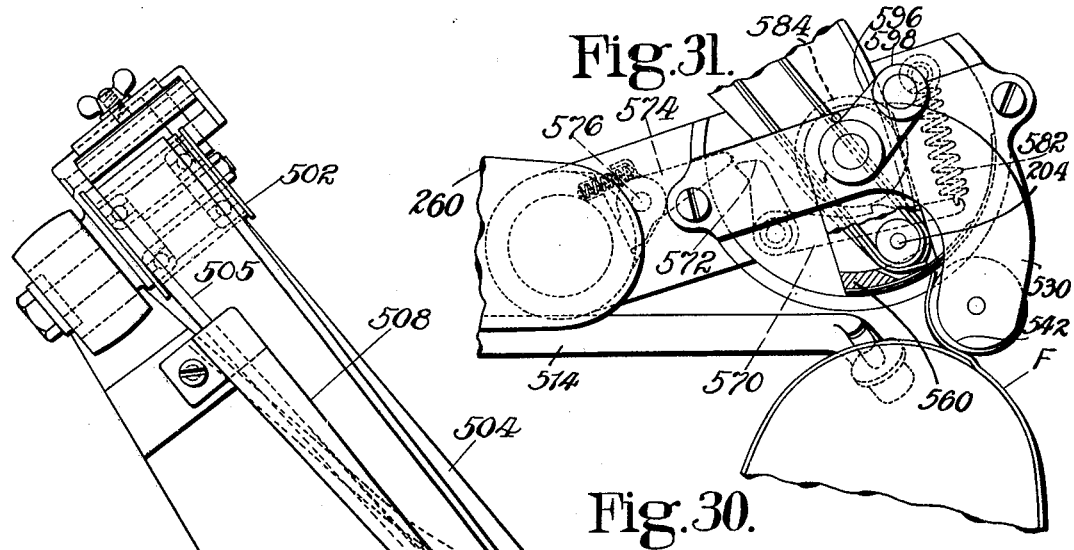
Fig. 31 is a fragmentary view of a portion of said tool showing the parts in a position where the foxing strip has just been cut.
Figure 30:
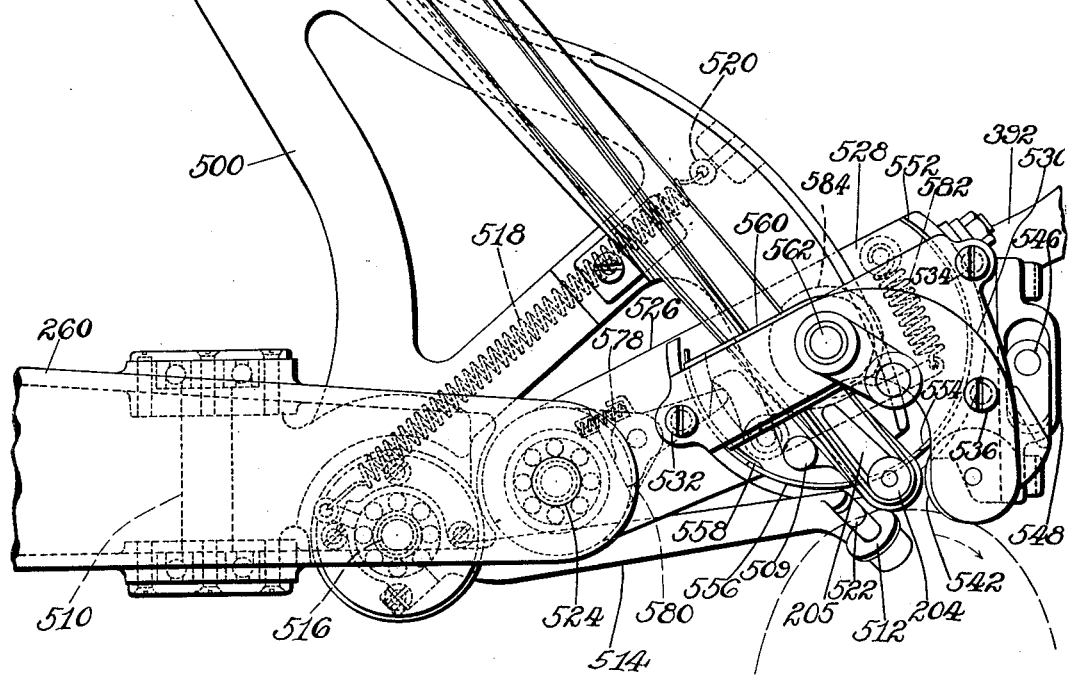
Fig. 30 is a plan view of the foxing laying tool.

The actuation of the latch 570 mentioned above is effected by contact of the tail 572 (Fig. 31) of said latch with the projecting arm 574 on a trigger member which is pivotally mounted at 576 on the lower end of the arm 260. The shape of this trigger member is best shown in Figs. 30 and 31 from which it will be seen that a compression spring 578 is provided which serves to press the trigger member 574 clockwise around its pivot until its heel 580 engages the end of the arm 260. This arrangement of the trigger member provides for the positive operation of the latch 570 as the arm 260 is swung counter-clockwise to cause the foxing laying roll 204 to be withdrawn into the box-like structure 528 at the completion of the laying operation. When the laying roll 204 is again projected beyond the forward opening of the box structure 528 for engagement of said laying roll 204 with the next shoe to be treated, when the trigger, which is continually pressed by a spring 582 into engagement with said disk 584 at the lower end of the pivot 564, will ride by the trigger member 574 and these parts will reassume the position shown in Fig. 30.

It will be noted, however, that no construction has been described for resetting the knife carrier 560. This has been accomplished, however, prior to the engagement of the presser roll with another shoe by parts shown in Figs. 1 and 3 and comprising a resetting arm 586 pivoted upon an extension 588 of the casting 40 which supports the shoe locating members 18 and 20. This resetting arm is urged to the position shown in Fig. 3, where the heel 588 on said arm engages an abutment 590 provided on the bell crank 22 (Fig. 3), by means of a spring 592 attached to an intermediate part of the resetting arm 586 and to a pin 594 carried on said bell crank 22. Cooperation between this resetting arm and the knife carrier 560 is effected through a crank 596 (Fig. 27) secured to the upper end of the pivot 562 for said knife carrier and provided with a roll 598. At the completion of the operation of cutting off the foxing strip as shown in Fig. 31, the roll 598 and the crank 596 are in the position shown in said Fig. 31. When the next shoe is put into the machine and the shoe locating devices 18 and 20 are brought into engagement with the shoe, the movement of the bell crank 22 supporting the right-hand locating device 20 (Fig. 1) will be effective to move the abutment 590 away from the heel 588 of the resetting arm 586 and to apply an additional tension to the spring 592 to cause the outer end of the resetting arm to engage with the roller 598 on the knife carrier and to swing the knife carrier through a partial revolution to the position shown in Fig. 30 where the latch 570 will again engage the notch in the edge of the disk 584 to hold the knife in reset position.

*Operation of the machine as a foxing cementer*

Supposing that the machine has been provided with the foxing cementing tool and the coacting receptacle, shown in Figs. 4 and 18 to 25 inclusive, the operator will place a shoe to be cemented upon the lower clamp 16 and, depressing the treadle 30 to bring the locating members 18 and 20 against the shoe to center it on the clamp, will adjust the lever 320 to a position determined in advance as most suitable for the particular size of shoe to be treated and lock it there by means of the pin 322 (Fig. 2). For the cementing operation the sleeve 46 will be set in the proper position so that the machine when started will give the shoe one complete revolution plus a small predetermined overlap designed to ensure complete coverage of the foxing area. The treadle 30 may then be released and the starting treadle 164 depressed to close the clutch and transmit the power of the motor to move parts of the machine. This will cause the arm 60 supporting the upper shoe clamps 12, 14 to be moved down so as to clamp the shoe and to depress it to the level of the operating tool, as shown in Fig. 1. The backing-off mechanism illustrated in Figs. 5 and 15 to 17 inclusive will rotate the arm 368 counterclockwise to allow the tool to be moved gently into contact with the shoe under the impulse of the spring 261, the pawl 358 remaining in contact with the ratchet 356 and riding under the shield as shown in Fig. 15. The intermittent drive mechanism shown particularly in Fig. 11 will then start the rotation of the shoe to carry all portions of the foxing area 11 past the cement applying tool. During this rotation of the shoe, the compensating mechanism illustrated in Figs. 5, 6 and 8 will move the pivotal support for the tool carrying arm 260 through an elongated path such as that shown in Fig. 4 so that the position of the tool will always be advantageous with respect to the shoe. It will be assumed that the cement applying tool as a unit has been adjusted vertically with respect to its carrying arm by means of the thumb screw 489 so that the edge of the shield 444 will contact with the shoe exactly at the upper edge of the foxing area. This adjustment will depend upon the width of the foxing area desired by any particular manufacturer and will only need to be changed at rare intervals in the case of a radical change in the style of shoe to be cemented. During the rotation of the shoe, cement will be picked up from the receptacle 400 by the driven disk 414 and delivered to the trough 440 by means of the scrapers 442. The cement will flow down the trough as indicated in Figs. 24 and 25 across the foxing area of the shoe and any surplus cement will drop back into the receptacle 400. This falling cement will be deflected into contact with undercut portions of the shoe as in Fig. 25 by the deflector 456. The level of the tool as a whole and hence of the edge of the shield will be determined by means of the disk 482 and its associated roller 484 contacting with the shoe near its peripheral corner. After the shoe has made at least one complete revolution so that the whole of its foxing area has been cemented, the backing-off mechanism of Figs. 15—17 will operate through the positions shown in Figs. 5 and 17 to move the pawl 358 into contact with the ratchet 356 so as to push the tool away from the shoe a predetermined minimum distance of perhaps two inches, which distance will be the same regardless of the size of the shoe being coated. At this time, the intermittent drive of Fig. 11 will have brought the shoe to rest easily and the movement of the shoe will cease before the one revolution clutch disconnects the motor from the drive shaft of the machine. The power of the machine is then utilized for raising the upper clamp by lifting the arm 60, 62 by the action of the cam 239 shown in Fig. 2.

*Operation of the machine as a foxing layer*

When the machine is to be used as a foxing layer the tool shown in Figs. 1, 3 and 26 to 31 inclusive will be mounted on the machine, and then because the manufacturer will usually desire to overlap the ends of the foxing strip, the hand wheel 58 will be adjusted to move the shoe clamps and the shoe positioning parts to an angle with respect to the front of the machine so that the foxing laying roll 204 when at rest will contact not with the extreme rear end of the shoe as shown in Fig. 3, but with the shoe at a point, such as point A. Assuming that the lever 320 has been adjusted to the desired position for the size of the shoe to be treated, the operator will then depress the treadle 30 to position the shoe on the lower clamp 16, the separation of the blocks 34 on each of the positioning members 18, 20 having been adjusted to a point suitable for the approximate size of the shoe to be treated. This operation of locating the shoe will at the same time reset the knife of the cutting-off mechanism by the resetting lever 586 (Fig. 3). Upon depression of the starting treadle the machine will then clamp the shoe and turn it counterclockwise to position B of Fig. 3 and then bring the tool into contact with the shoe at a level determined by the disk 512 and its cylinder 522 such that the upper edge of the foxing strip F will be exactly opposite to the uper edge of the previously cemented foxing area. The free end of the foxing strip supported on the belt 504 and held in position adjacent to the applying roll 204 by the post 509 will be pressed against the shoe and progressively applied at various levels as the shoe is rotated. Following the application of the strip by the roll 204, the strip will be pressed even more firmly into contact with the shoe by means of the presser roll 542, the lower end of which is swung inwardly toward the shoe by the spring 544, and which will conform to the curvature of the portion of the shoe with which it contacts, because of its resilient construction. During this operation, the foxing strip will be carried forwardly by movement of the belt as it rolls along the shoe. The shoe will be tilted, as it is rotated, by the action of the cam 120 in order particularly to bring the forward portion of the shoe substantially to the level of the heel portion thereof. The compensating mechanism will maintain the tool as a whole, and especially the successively acting rolls 204 and 542 in the most advantageous relation with respect to the shoe. By reason of the fact that the presser roll 542 contacts with the shoe first, as the tool is dropped gently against the work, the laying roll and its supporting frame 500 will occupy during the rotation of the shoe a position with respect to the presser roll and to the cutting-off knife shown in Fig. 30. After the shoe has been rotated from the position B and has finished a complete revolution counted from the point B, plus a fractional rotation almost to the point A, the backing-off mechanism will be rendered effective to move the tool carrying arm away from the shoe so that the laying roll will be withdrawn into the box-like structure upon the presser roll carrier somewhat as shown in Fig. 31. By reason of this change in relative positions between the presser roll carrier and the tool carrying arm, the latch 570 will be released by riding over the end of the trigger 574 and the spring actuated cutting-off shears will be operated to sever the foxing strip between the laying roll 204 and the presser roll 542 also as shown in Fig. 31. This will occur before the shoe has quite completed its rotation so that the presser roll will be effective to complete the application to the shoe of the severed end of the foxing strip to overlap the end first laid. A continued movement of the backing-off mechanism will then carry the presser roll itself away from the shoe along with the rest of the tool and the intermittent drive of Fig. 11 will bring the shoe gradually to a stop. After this the upper clamp carrying arm 60 will be raised to release the shoe.

Having thus described my invention, what I claim as new and desire to secure as Letters Patent of the United States is:

1. In a machine for treating the foxing area of a shoe, a shoe support provided with shoe gripping means, an adjacent operating tool, said support and said tool being relatively movable to cause the tool to traverse the length of and to perform an operation upon successive parts of the foxing area, and power operated means constructed and arranged to grip a shoe on said support, then to effect said relative traversing movement, and subsequently to release the shoe.

2. In a machine for treating the foxing area of a shoe, means for supporting the shoe for turning movement to present various portions of the shoe, and power operated means constructed and arranged to clamp said shoe upon its support, then to turn said shoe, and subsequently to release the clamp.

3. In a machine for treating the foxing area of a shoe, coacting shoe gripping means, means for supporting the shoe for turning movement to present various portions of the shoe, a movably mounted treating tool, and power operated means constructed and arranged to close said gripping means in engagement with a shoe, to move said tool into contact with said shoe, then to turn the shoe, and subsequently to withdraw the tool from the shoe and release the shoe.

4. In a machine for treating the foxing area of a shoe, means for supporting a shoe for turning movement, a movably mounted treating tool, and power operated means constructed and arranged to clamp the shoe for turning movement, to move said tool into contact with the shoe, then to turn the shoe, and subsequently to withdraw the tool and release the clamping means.

5. In a machine for treating the foxing area of a shoe including power operated clamping means, means for rotatably supporting a shoe, means for rotating said shoe comprising a pinion and a mutilated gear meshing with said pinion, and cam operated means for accelerating said pinion prior to the contact of the mutilated gear therewith whereby a smooth meshing of said gear and said pinion is effected.

6. In a machine for treating the foxing area of a shoe including a power operated clamping means, means for rotatably supporting a shoe, means for rotating said shoe comprising a pinion and a mutilated gear meshing with said pinion, and cam operated means for decelerating said pinion prior to the disengagement of the mutilated gear therefrom.

7. In a machine for treating the foxing area of a shoe, a shoe support, a pivotal tool carrying arm, said support and said tool carrying arm being relatively movable to cause the tool on said arm to traverse the foxing area of the shoe, means for swinging said arm to hold the tool in contact with the shoe, compensating mechanism for moving the pivot pin of the arm bodily to various positions in order to maintain a desired relation between said arm and the periphery of the shoe, and operator controlled means for shifting said compensating mechanism bodily thereby better to adapt the machine for extreme differences in sizes of shoes.

8. In a machine for treating the foxing areas of shoes, means for rotating a shoe, a tool carrying arm, a pivot for movably supporting said arm, means for swinging said arm around the pivot to hold the tool in contact with the shoe, compensating mechanism for moving said pivot bodily to various positions in order to maintain a desired relation between the tool carrying arm and the periphery of the shoe as the latter is rotated, and manually operable means for controlling the field of operation of said compensating mechanism.

9. In a machine for treating the foxing areas of shoes, means for rotating a shoe, a tool carrying arm, a pivot for movably supporting said arm, means for swinging said arm around the pivot to hold the tool in contact with the shoe, compensating mechanism for moving said pivot bodily to various positions in order to maintain a desired relation between the tool carrying arm and the periphery of the shoe as the latter is rotated, said compensating mechanism including a driven crank, and means for manually moving said crank bodily for rotation about a different center to make the machine more effective for operation on shoes of radically different sizes.

10. In a machine for treating the foxing areas of shoes, means for rotating a shoe, a tool carrying arm, a pivot for movably supporting said arm, means for swinging said arm around the pivot to hold the tool in contact with the shoe, compensating mechanism for moving said pivot bodily to various positions in order to maintain a desired relation between the tool carrying arm and the periphery of the shoe, as the latter is rotated, said compensating mechanism including a sliding pivot, and means for manually adjusting the position of said pivot whereby the machine is made more effective for operation on shoes of radically different sizes.

11. In a machine for treating the foxing areas of shoes, means for rotating a shoe, a tool carrying arm, a pivot movably supporting said arm, means for swinging said arm around the pivot to hold the tool in contact with the shoe, compensating mechanism for moving said pivot bodily to various positions in order to maintain a desired relation between the tool carrying arm and the periphery of the shoe as the latter is rotated, said compensating mechanism including a driven crank, a plate connected to said crank, a pivoted member for slidably supporting said plate, and manually operable means for bodily shifting said driven crank and said pivotal support whereby the centers of said support and said crank are mounted in fixed relation as they are bodily adjusted to make the compensating mechanism more effective for shoes of radically different sizes.

12. In a machine for treating the foxing areas of shoes, means for rotating a shoe, a tool carrying arm, a pivot for movably supporting said arm, means for swinging said arm around the pivot to hold the tool in contact with the shoe, compensating mechanism for moving said pivot bodily to various positions in order to maintain a desired relation between the tool carrying arm and the periphery of the shoe as the latter is rotated, said compensating mechanism including a driven crank, intermeshing gears for driving said crank, a housing for said gears, a splined connection to one of said gears, and manually operable means for sliding said housing to move one of said gears along its spline whereby the machine is made more effective for shoes of radically different sizes.

13. In a shoe treating machine, a rotatable shoe support, a supporting bracket offset from said shoe support to avoid interference with the shoe support as it is rotated, shoe locating or centering devices mounted on swinging arms pivoted on said bracket, and means for equalizing the in and out movement of the arms.

14. In a shoe treating machine, a rotatable work support, means for locating the shoe in centralized position on said support comprising locating members mounted upon swinging arms, said arms being bowed to avoid interference with the shoe or its support during rotation thereof, and means for equalizing the movement of said shoe locating members.

15. In a shoe treating machine, a shoe support, shoe locating or centering members comprising relatively adjustable shoe engaging blocks, and means for supporting said locating devices comprising swinging arms mounted for equalizing movement.

16. In a shoe treating machine, a shoe support, swinging arms mounted for equalizing movement, shoe locating members carried by said arms, operator controlled means for swinging the arms in one direction, and resilient means for swinging the arms to draw the locating members away from the shoe support.

17. In a shoe treating machine, a rotatable shoe support adapted to be turned about an upright axis with the support at a predetermined level, swingingly mounted shoe centering arms constructed and arranged to engage a shoe to locate it on said support and to avoid said shoe during its turning movement, resilient means for raising said shoe support to the level of said shoe locating means, a top clamp for the shoe which has been thus positioned, and means for depressing said top clamp to move the shoe and its support to its normal operating level below the level of said positioning means.

18. In a shoe treating machine, a shoe support, an adjacent operating tool, said support and said tool being relatively movable to effect an operation on the shoe, shoe positioning means above the operating tool and out of the range thereof, and means for raising said shoe support to the level of said shoe positioning means and depressing it to the level of the operating tool.

19. In a shoe treating machine, a shoe support adapted to occupy a predetermined level during the operation of the machine, shoe positioning means, means for moving said shoe support to bring the shoe to a different level for engagement by said shoe positioning means to locate the shoe on the shoe support, and means for returning said shoe support to its normal operating level.

20. In a shoe treating machine, a shoe support adapted to be positioned at a predetermined level for the operation of the machine, shoe positioning arms disposed at a different level, means for moving said shoe support to the level of the positioning arms, means for bringing the positioning arms into engagement with the shoe to locate the shoe on the shoe support, means for clamping the shoe thus positioned, and means for moving the shoe to its operating level out of the range of the positioning arms.

21. In a foxing treating machine, a rotatable shoe support, adapted to be turned about an upright axis with the support at a predetermined level, shoe positioning means, resilient means for raising said shoe suport to the level of the shoe positioning means whereby a shoe may be located on the supoprt by said means, a clamping device for engagement with the shoe in opposition to said shoe support, and means for moving said clamping device to move the shoe and shoe support to its normal operating level.

22. In a foxing treating machine, a rotatable shoe support, resilient means for raising said shoe support to an abnormal position, relatively movable centering arms to engage the ends of the shoe to position it on the support, a top clamp for the shoe which has been thus positioned, and means for depressing said top clamp to move the shoe and its support to its normal operating level where the positioning means will be out of the way during the rotation of the shoe.

23. In a shoe treating machine, a shoe supporting mechanism comprising a supporting post having a non-circular upper end, said upper end being provided with a recess terminating in a hook, and a shoe supporting plate fitting the upper end of the post and provided with a pivot pin received in said recess for engagement with said post, whereby said supporting plate may be rotated with said post and readily replaced by a plate of different size.

24. In a shoe treating machine, a hollow shoe supporting post having a rectangular upper end, said upper end terminating in a hook, a clamping plate fitting over the upper end of said post and tiltably engaging said hook, and means movable within said hollow post for raising said plate to tilt the shoe.

25. In a foxing treating machine, a shoe supporting mechanism comprising a hollow rotatable post, a shoe support tiltably mounted on said post, means for rotating said shoe support by rotating said post, a rod extending through said post, the upper end of which is adapted to engage said shoe support to tilt the same, and a cam at the lower end of the post for engagement with said rod to tilt the shoe in time relation to the rotation thereof.

26. In a foxing treating machine, a shoe supporting plate, a sleeve carrying said plate, a driving gear splined to said sleeve, a spring inside said sleeve for lifting said sleeve to an abnormal position, and a rod within said spring and said sleeve for tilting said shoe while it is rotated.

27. In a foxing treating machine, a lower shoe clamp comprising an upright sleeve provided at its upper end with a tiltably mounted shoe supporting plate, driving means splined to said sleeve, resilient means normally urging said sleeve upward, an upper clamp for the shoe constructed and arranged to be moved into engagement with the shoe and to resist said spring, and a rod within said sleeve for tilting said shoe.

28. In a shoe treating machine, a rotatable shoe supporting bottom clamp, means for driving said clamp to rotate the shoe, an overhanging arm, a top clamp rotatably mounted in said arm, means for rotating said top clamp, and means for raising and lowering said arm without disturbing said rotating means.

29. In a shoe treating machine, a rotatable bottom clamp, resilient means for lifting said clamp to an abnormal position, a rotatable top clamp, a driving connection therefor, and means for depressing said top clamp to move the shoe and the bottom clamp to its normal operating position without disturbing said driving connection.

30. In a machine for treating the foxing area of a shoe, a shoe support, a treating tool, a swinging member carrying said tool, means for maintaining the tool in contact with the shoe, an extension arm pivoted on said swinging member for movement about an axis at right angles to the axis of the swinging member to allow movement of the tool heightwise of the shoe, and a rigid arm secured to said extension arm and contacting with the shoe to guide the heightwise movement of the tool, said arm being mounted for in and out movement with respect to the tool to permit variation of the horizontal separation of the tool and the arm at undercut portions of the shoe.

31. In a machine for treating the foxing area of a shoe, a shoe support, a treating tool mounted for up and down and in and out movement, and means for controlling said up and down movements comprising a member rolling along the bottom of the shoe, said member constructed and arranged to tend to creep in toward the center of the shoe and maintain said member in engagement with the bottom of the shoe.

32. In a machine for treating the foxing area of a shoe, a shoe support, a treating tool mounted for up and down and in and out movement, and means for controlling said up and down movements comprising a member rolling along the bottom of the shoe, said member comprising means for engaging the periphery of the shoe and means for engaging the bottom of the shoe.

33. In a machine for treating the foxing area of a shoe, a shoe support, a treating tool mounted for up and down and in and out movement, and means for controlling said up and down movements comprising a member rolling along the bottom of the shoe, said bottom engaging means being constructed and arranged to tend to creep toward the central portion of the shoe so as to maintain contact therebetween.

34. In a machine for treating the foxing area of a shoe, a shoe support, a treating tool mounted for up and down and in and out movement, means for controlling said up and down movements comprising a member rolling along the bottom of the shoe, and means for guiding said up and down movements comprising a roll for engaging the periphery of the shoe and an angularly disposed rotary member for engaging the bottom of the shoe.

35. In a machine for treating the foxing area of a shoe, a shoe support, a treating tool mounted for up and down and in and out movement, and means for controlling said up and down movements comprising a member rolling along the bottom of the shoe, said member for guiding the up and down movements comprising a roller for engaging the shoe near its corner and a rotating member for engaging the bottom of the shoe set at an acute angle with respect to the line of travel.

36. In a machine for treating the foxing area of a shoe, a shoe support, a treating tool mounted for up and down and in and out movement, means for controlling said up and down movements comprising a member rolling along the bottom of the shoe, said means for controlling the up and down movements comprising a rotatable member engaging the bottom of the shoe and mounted so that it tends to creep toward the central portion of the shoe, and means for limiting the inward movement of said bottom engaging member.

37. In a machine for treating the foxing area of a shoe, a shoe support, a treating tool mounted for up and down and in and out movement, means for controlling said up and down movements comprising a member rolling along the bottom of the shoe, said controlling means comprising a supporting spindle inclined with respect to the bottom of the shoe, and a disk mounted on said spindle for rolling contact with the bottom of the shoe.

38. In a machine for treating the foxing area of a shoe, a shoe support, a treating tool mounted for up and down and in and out movement, means for controlling said up and down movements comprising a member rolling along the bottom of the shoe, said controlling means comprising a supporting spindle inclined with respect to the bottom of the shoe, a disk mounted on said spindle for rolling contact with the bottom of the shoe, and means for limiting the initial movement of said disk toward the inner portion of said shoe.

39. In a machine for treating the foxing area of a shoe, a shoe support, a treating tool mounted for up and down and in and out movement, and means for guiding said up and down movement comprising an inclined spindle carrying a disk for engagement with the bottom of the shoe, and a roller for engagement with the periphery of the shoe, said disk tending to creep toward the central portion of the shoe and said roller limiting said creeping tendency.

40. In a machine for treating the foxing area of a shoe, a shoe support, a treating tool mounted for up and down and in and out movement, means for guiding said up and down movement comprising a spindle inclined with respect to the bottom of the shoe and also inclined with respect to the path of relative movement between the shoe and said guiding means, and means on said spindle for engaging the peripheral corner of the shoe.

41. In a machine for treating the foxing area of a shoe, means for supporting a shoe in upright position for rotation, a swinging member carrying a tool, means for swinging said member to maintain the tool in engagement with the shoe, means for supporting said tool on said member comprising a pivoted extension constructed and arranged to allow up and down movement of the tool with respect to the member and heightwise of the shoe, and means for controlling said up and down movement comprising a member constructed and arranged to engage the peripheral corner of the shoe adjacent to the foxing area as it is rotated and tending to creep in toward the central portion of the shoe.

42. In a machine for treating the foxing area of a shoe, means for supporting a shoe in upright position for rotation, a swinging member carrying a tool, means for swinging said member to maintain the tool in engagement with the shoe, means for supporting said tool on said member comprising a pivoted extension constructed and arranged to allow up and down movement of the tool with respect to the member and heightwise of the shoe, and an arm pivotally mounted on said tool carrying extension for movement around an upright axis and carrying means for engaging the peripheral corner of the shoe to guide the up and down movements of the tool.

43. In a machine for treating the foxing area of a shoe, means for supporting a shoe in upright position for rotation, a swinging arm carrying a tool, means for swinging said arm to maintain the tool in engagement with the shoe, means for supporting said tool on said arm comprising a pivoted extension constructed and arranged to allow up and down movement of the tool with respect to the arm and heightwise of the shoe, an arm pivotally mounted on said tool carrying extension for movement around an upright axis and carrying means for engaging the peripheral corner of the shoe to guide the up and down movements of the tool, and a spring tending to urge said latter arm away from said extension to a predetermined limit.

44. In a foxing laying machine, a shoe support, a foxing applying tool, said support and said tool being mounted for relative movement to cause the foxing to be laid progressively around the periphery of the shoe, means for supporting said applying tool constructed and arranged to permit movement heightwise of the shoe as the applying tool is held in contact with the shoe, and means connected with said foxing applying tool and arranged for engagement with the bottom of the shoe thereby to guide said heightwise movements.

45. In a foxing laying machine, a foxing applying member, a swinging support for said member, means for mounting said member on said support constructed and arranged to allow movement of the member heightwise of a shoe, means for supporting a shoe in upright position and turning it to carry successive portions of the foxing area past the tool, and rigid means associated with said foxing applying member arranged for engagement with the bottom of the shoe thereby to control the heightwise movements of the applying member.

46. In a foxing laying machine, a swinging member pivoted for lateral movements, an extension on said member pivoted for up and down movement, a foxing applying member carried by said extension, means for rotatably supporting a shoe to carry it past the applying member, and rolling means arranged for contact with the bottom of the shoe to guide the heightwise movements of said applying member as the foxing is laid on the shoe.

47. In a foxing laying machine, a swinging member pivoted for lateral movements, an extension on said member pivoted for up and down movement, a foxing applying member carried by said extension, means for rotatably supporting a shoe to carry it past the applying member, and rolling means arranged for engagement with the bottom and peripheral corner of the shoe to guide the heightwise movements of said applying member as the foxing is laid on the shoe.

48. In a foxing laying machine, a swinging member pivoted for lateral movements, an extension on said member pivoted for up and down movement, a foxing applying member carried by said extension, means for rotatably supporting a shoe to carry it past the applying member, and rolling means mounted on said extension arm arranged for engagement with the shoe adjacent to its peripheral corner to guide the heightwise movements of said applying member as the foxing is laid on the shoe.

49. In a foxing laying machine, a swinging member pivoted for lateral movements, an extension on said member pivoted for up and down movement, a foxing applying member carried by said extension, means for rotatably supporting a shoe to carry it past the applying member, and a guiding arm on said extension provided with a rolling member mounted for engagement with the bottom of the shoe to control the position of the extension with respect to the swinging member thereby to cause the foxing to be applied directly upon the foxing area at all parts of the shoe.

50. In a foxing laying machine, a swinging member pivoted for lateral movements, an extension on said member pivoted for up and down movement, a foxing applying member carried by said extension, means for rotatably supporting a shoe to carry it past the applying member, a guide arm pivoted on an upright axis on said extension arm and provided with an angularly disposed disk for contact with the bottom of the shoe, said disk tending to creep toward the center of the shoe and to guide the up and down movements of the extension arm constructed and arranged to permit the foxing to be laid directly on the foxing area, and means for limiting the creeping action of said disk.

51. In a foxing laying machine, a swinging member pivoted for lateral movements, an extension on said member pivoted for up and down movement, a foxing applying member carried by said extension, means for rotatably supporting a shoe to carry it past the applying member, a guide arm pivoted on an upright axis on said extension arm, said guide arm being spring-pressed away from the applying member and provided with an angularly disposed disk for contact with the bottom of the shoe, said disk tending to creep toward the center of the shoe and to guide the up and down movements of the extension arm constructed and arranged to permit the foxing to be laid directly on the foxing area, and means for limiting the creeping action of said disk.

52. In a foxing laying machine, a swinging member pivoted for lateral movements, a presser roll carrier pivoted on said member on an upright axis, a presser roll on said carrier, an extension on said member pivoted for up and down movement, a foxing applying member carried by said extension, means for rotatably supporting a shoe to carry it past the applying member, and rolling means arranged for contact with the bottom of the shoe to guide the heightwise movements of said applying member as the foxing is laid on the shoe.

53. In a foxing laying machine, a swinging member pivoted for lateral movements, a swinging presser roll on said member mounted for movement around angularly related axes and spring pressed-toward the shoe, an extension on said member pivoted for up and down movement, a foxing applying member carried by said extension, means for rotatably supporting a shoe to carry it past the applying member, and rolling means arranged for contact with the bottom of the shoe to guide the heightwise movements of said applying member as the foxing is laid on the shoe.

54. In a foxing laying machine, a swinging member mounted for lateral movement, a foxing applying member, an extension on said swinging member carrying said foxing applying member and movable up and down with respect to the arm, a shoe support, means for holding the applying member in contact with a shoe on the support, a presser roll carrier mounted on said swinging member for independent in and out movements, a presser roll on said carrier, and resilient means for holding said presser roll against the foxing which has been laid.

55. In a foxing laying machine, a swinging member mounted for lateral movement, a foxing applying member, an extension on said swinging member carrying said foxing applying member and movable up and down with respect to the swinging member, a shoe support, means for holding the applying member in contact with a shoe on the support, a presser roll carrier mounted on said swinging member for independent in and out movements, resilient means urging the carrier toward the shoe, a presser roll hung on said carrier, and independent resilient means urging the presser roll toward the shoe, 56. In a foxing laying machine, a swinging member mounted for lateral movement, a foxing applying member, an extension on said swinging member carrying said foxing applying member and movable up and down with respect to the swinging member, a shoe support, means for holding the applying member in contact with a shoe on the support, a presser roll carrier mounted on said arm for independent in and out movements, a presser roll hung at its upper end on said carrier, and independent resilient means urging the lower end of the presser roll toward the shoe.

57. In a foxing laying machine, a swinging member mounted for lateral movement, a foxing applying member, an extension on said swinging member carrying said foxing applying member and movable up and down with respect to the swinging member, a shoe support, means for holding the applying member in contact with a shoe on the support, a presser roll carrier mounted on said swinging member for independent in and out movements, a hanger pivoted on said carrier at its upper end constructed and arranged to swing in and out toward and away from the shoe, a presser roll pivoted on an upright axis in said hanger, and independent resilient means urging said pressor roll carrier and said hanger toward the shoe.

58. In a foxing laying machine, a shoe support, a foxing applying tool, a presser roll carrier mounted for in and out movement with respect to said tool, a presser roll swung on said carrier, a guide for the lower end of said swinging presser roll, and resilient means urging said presser roll toward the shoe.

59. In a foxing-laying machine, a shoe support, a foxing-applying tool, a presser-roll carrier mounted for in-and-out movement with respect to the shoe, and a presser roll swingingly mounted on said carrier to coact with the varying inclinations of the sides of the shoes.

60. In a foxing laying machine, a foxing applying member, a shoe support, said member and said support being constructed and arranged for relative movement to carry the member around the shoe on the support to apply a foxing strip, and means for cutting said foxing strip, one end of which has been applied to the shoe.

61. In a foxing laying machine, a foxing applying member, means for movably supporting a shoe to carry it past said applying member to permit the application of a foxing strip, and means for cutting a foxing strip, one end of which has been applied to the shoe.

62. In a foxing laying machine, a foxing applying member, means for movably supporting a shoe to carry it past said applying member, and shears for cutting the foxing strip, one end of which has been applied to the shoe.

63. In a foxing laying machine, a foxing applying member, means for movably supporting a shoe constructed and arranged to carry it past said applying member, a movable support for said applying member, means urging said applying member toward the shoe, means for separating said applying member from the shoe after the foxing has been applied, and cutting-off means adapted to be interposed between the applying member and the shoe to sever the end of the foxing strip which has been applied.

64. In a foxing-laying machine, a foxing-applying member, means for guiding to said member a strip of foxing longer than would be needed for a single shoe, means for cutting off the foxing strip after a portion thereof has been applied to the shoe, and means for pressing the remaining portion of the severed foxing strip to the shoe.

65. In a foxing-laying machine, a foxing-applying roll, a shoe support, means for producing relative movement between said roll and said support to cause the roll to traverse the shoe, means for guiding to said roll a strip of foxing longer than is needed for a shoe, means actuated by rotation of said roll for feeding said foxing strip, and cutting-off means operating adjacent to the applying roll for severing the desired length of foxing strip for application to a shoe.

66. In a foxing-laying machine, a foxing-applying member, means for movably supporting the shoe to carry it past said applying member, means for guiding to said applying member a strip of foxing longer than is needed for a single shoe, and a swingingly mounted cutting-off knife for severing the strip a portion of which has been applied to the shoe.

67. A machine according to claim 66 in which a shear blade is associated with said cutting-off knife.

68. A machine according to claim 66 in which a substantially cylindrical cutting-off knife is swingingly mounted about the center of the cylinder.

69. In a foxing laying machine, a foxing applying member, a movable support for said applying member arranged to hold it in engagement with the shoe, a knife carrier movably mounted on said support, and means for producing relative movement between said knife carrier and said applying member constructed and arranged to permit a knife in said carrier to be interposed between the applying member and the shoe to sever the end of the foxing strip which has been applied.

70. In a foxing laying machine, a foxing applying member, means for supporting a shoe to carry it past said applying member, a movable support for said applying member, means urging said support in one direction to hold said applying member against a shoe on said support, a carrier movably mounted on said support, shears on said carrier, and shoe engaging means on said carrier constructed and arranged to cause relative movement of the applying member and the shears constructed and arranged to permit, upon withdrawal of the applying member, the shears to be positioned to cut the end of the foxing strip which has been applied to the shoe.

71. In a foxing laying machine, a foxing applying member, means to support a shoe with respect to said applying member constructed and arranged to permit the applying member to be carried around the shoe, a movable support for said applying member constructed and arranged to hold it in contact with the shoe and to permit withdrawal at the completion of the operation, a presser roll positioned to follow the applying member progressively to roll the applied strip on the shoe, means for maintaining said presser roll in contact with the strip after the applying roll has been withdrawn, and cutting-off means associated with the presser roll to sever the end of the strip.

72. In a foxing laying machine, a foxing applying member, means to support a shoe with respect to said applying member constructed and arranged to permit the applying member to be carried around the shoe, a movable support for said applying member constructed and arranged to hold it in contact with the shoe and to permit withdrawal at the completion of the operation, a presser roll positioned to follow the applying member progressively to roll the applied strip on the shoe, means for maintaining said presser roll in contact with the strip after the applying roll has been withdrawn, and cutting-off means associated with the presser roll to sever the end of the strip, said shoe supporting means being arranged to continue movement of the shoe after the foxing strip has been severed whereby the presser roll will force the loose end of the severed strip into contact with the shoe.

73. In a foxing laying machine, a foxing applying member, means for movably supporting a shoe to carry it past said applying member, a movable support for said applying member constructed and arranged to hold said applying member in engagement with a shoe on said support and to withdraw the applying member at the completion of the operation, a carrier movably mounted upon said support for the applying member, means for urging said carrier toward the shoe independently of the movements of said applying member support, a knife support on said carrier, and a knife on said knife support movable to sever the strip extending between the applying member and the shoe after the applying member has been withdrawn from the shoe.

74. A machine according to claim 73 in which said cutting-off knife is swingingly mounted on said support.

75. A machine according to claim 73 in which said cutting-off knife is spring-actuated.

76. A machine according to claim 73 in which said cutting-off knife is spring-actuated and has a latch to hold said knife in set position.

77. A machine according to claim 73 in which a shear blade is associated with said cutting-off knife.

78. A machine according to claim 73 in which said cutting-off knife is swingingly mounted and associated with a curved shear blade.

79. A machine according to claim 73 in which said cutting-off knife is swingingly mounted and is associated with a shear blade having an overlapping extension maintained always in contact with said swinging blade.

80. In a foxing laying machine, a foxing applying member, a movable shoe support constructed and arranged to carry successive portions of the foxing area of a shoe past said applying member, a swinging arm carrying said applying member, said arm being spring-pressed normally to hold the applying member against the shoe, a carrier pivoted on said arm having a portion for contact with the shoe, means for swinging said arm to withdraw the applying member from the shoe, resilient means acting upon said carrier tending to hold it in contact with the shoe after the applying member has been withdrawn, a spring-actuated cutting member on said carrier, and latch means operated by the relative movement between the carrier and the arm to release said cutting member to sever a foxing strip between the shoe and the applying member after the latter has been withdrawn.

81. A machine according to claim 80 in which a trigger member is arranged for engagement with said latch to release the cutting member.

82. A machine according to claim 80 in which a resiliently mounted trigger member is arranged for engagement with said latch to release the cutting member and is constructed and arranged to permit the automatic resetting of the latch member.

83. A machine according to claim 80 in which said cutting member is provided with a resetting arm.

84. A machine according to claim 80 in which a resetting means is provided on said cutting member, said machine having a movable shoe engaging member associated with said shoe support, and means for automatically engaging said resetting means to reset the knife upon movement of said shoe engaging means to bring it into engagement with the next shoe placed upon the support.

SIDNEY J. FINN.